United States Patent
Garwood

(10) Patent No.: US 9,872,505 B2
(45) Date of Patent: Jan. 23, 2018

(54) PRESERVATION OF MICRONUTRIENTS IN THE SEPARATION OF FAT AND LEAN FROM BEEF

(76) Inventor: Anthony J. M. Garwood, Mercer Island, WA (US)

( * ) Notice: Subject to any disclaimer, the term of this patent is extended or adjusted under 35 U.S.C. 154(b) by 807 days.

(21) Appl. No.: 13/523,588

(22) Filed: Jun. 14, 2012

(65) Prior Publication Data
US 2013/0337130 A1    Dec. 19, 2013

(51) Int. Cl.
*A23L 1/313* (2006.01)
*A22C 17/00* (2006.01)
*A23L 13/00* (2016.01)

(52) U.S. Cl.
CPC .............. *A22C 17/00* (2013.01); *A23L 13/00* (2016.08)

(58) Field of Classification Search
CPC . A22C 17/00; A23D 9/02; A23D 9/00; A23D 4/015; A23D 4/00; A23D 9/04; C11B 1/104; C11B 1/10; C11B 1/00; A23L 1/317; A23L 1/311; A23L 1/31; A23L 3/28; A23L 3/26; A23L 3/00
USPC ........ 426/248, 417, 480, 665, 237, 478, 479
See application file for complete search history.

(56) References Cited

U.S. PATENT DOCUMENTS

| | | | |
|---|---|---|---|
| 3,230,054 A * | 1/1966 | Ling | ........................ C11B 1/00 422/308 |
| 3,780,191 A | 12/1973 | Langer | |
| 4,402,987 A * | 9/1983 | von Lersner | ........... A23L 13/72 426/281 |
| 5,147,672 A | 9/1992 | McLachlan | |
| 5,435,443 A | 7/1995 | Hohenester | |
| 5,514,396 A * | 5/1996 | Mahboob | ................ A23L 13/60 426/243 |
| 5,552,173 A | 9/1996 | Singh | |
| 5,650,187 A | 7/1997 | Franklin | |
| 5,944,597 A | 8/1999 | Singh | |
| 7,666,456 B2 | 2/2010 | Garwood | |
| 8,137,722 B2 | 3/2012 | Garwood | |

(Continued)

FOREIGN PATENT DOCUMENTS

| | | | | |
|---|---|---|---|---|
| WO | WO 2008085715 | * | 7/2008 | ............. A22C 17/10 |
| WO | WO 2008085715 A2 * | | 7/2008 | ............. A22C 17/00 |

OTHER PUBLICATIONS

Rattagool, K. Scientific considerations of olestra as a fat substitute, Thesis, University North Texas, Dec. 1999) downloaded from the internet at http://digital.library.unt.edu/ark:/67531/metadc2240/m2/1/high_res_d/Thesis.pdf.*

(Continued)

*Primary Examiner* — Vera Stulii
(74) *Attorney, Agent, or Firm* — Christensen O'Connor Johnson Kindness PLLC

(57) ABSTRACT

A method for separating fat from lean, while minimizing the loss of micronutrients from the lean, is disclosed. The method includes combining a mixture of fat particles that are a majority of fat, and lean particles that are a majority of lean, with a saturated aqueous fluid, wherein a density of the fluid is greater than a density of the fat particles, and wherein the fluid is saturated with one or more components found in beef prior to being combined with the beef particles. The method includes collecting the fat particles separate from the lean particles by causing the fat particles to rise in the fluid, and collecting the lean particles. The saturated fluid reduces the depletion of micronutrients from the lean.

14 Claims, 12 Drawing Sheets

(56) References Cited

U.S. PATENT DOCUMENTS

| | | | |
|---|---|---|---|
| 2004/0081729 A1* | 4/2004 | Garwood | 426/235 |
| 2004/0131750 A1* | 7/2004 | Russell | A23J 1/02 |
| | | | 426/643 |
| 2005/0042346 A1* | 2/2005 | Garwood | 426/478 |
| 2005/0142250 A1* | 6/2005 | Garwood | 426/35 |
| 2006/0127545 A1* | 6/2006 | Newman | 426/326 |
| 2009/0214733 A1* | 8/2009 | Garwood | 426/417 |
| 2010/0112168 A1 | 5/2010 | Garwood | |
| 2011/0008505 A1 | 1/2011 | Garwood | |
| 2012/0128838 A1* | 5/2012 | Virippil | A22B 3/086 |
| | | | 426/231 |
| 2012/0231148 A1 | 9/2012 | Garwood | |
| 2012/0282382 A1 | 11/2012 | Garwood | |
| 2013/0115349 A1 | 5/2013 | Garwood | |

OTHER PUBLICATIONS

Appendix A, p. 44, Enhancing the Regulatory Decision-Making Approval Process for Direct Food Ingredient Technologies, Food Forum, Food and Nutrition Board, Inst. Of Medicine. National Academy Press, Washington DC. 1999.*

* cited by examiner

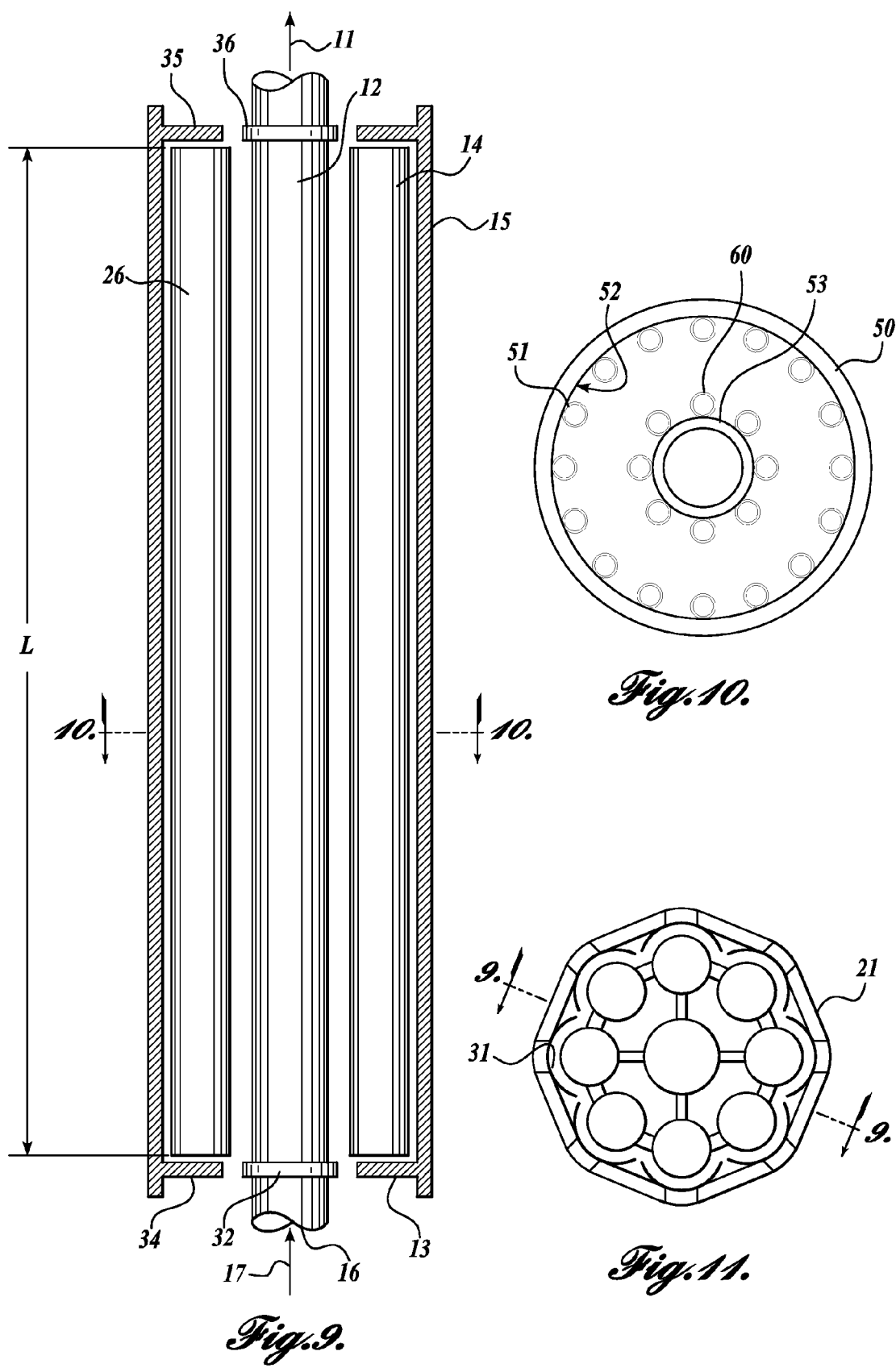

PRESERVATION OF MICRONUTRIENTS IN THE SEPARATION OF FAT AND LEAN FROM BEEF

BACKGROUND

During the process of boning a carcass, and particularly a beef carcass such as a steer or cow, the tallow and fat often referred to as "trim," is removed. Other "trim" is cut from primal beef portions during the slicing and disassembly process of carcasses that is required during preparation of small cuts for human consumption. Beef includes a fat component and a lean component. During these processes, a significant amount of lean can be cut from the carcass and carried away with the fat and/or tallow. Lean comprises predominantly muscle protein, although some amounts of fat and tallow are present, while fat and tallow comprise predominantly glycerides of fatty acids with connective tissue and collagen and are the predominant constituents of plant and animal fat. The lean content in trim may be as high as 45% to 50% by weight, or higher. Presently, trim has little use except for sausage production, or alternatively the fat may be rendered.

A need therefore exists to more efficiently separate the lower value tallow with fat from the higher value lean contained in trim and to more effectively kill, reduce, or completely remove the microbial pathogenic population and to eliminate sources of cross contamination and recontamination, while also producing a ground beef product of specific fat content.

SUMMARY

Disclosed are methods relating to the reduction in the tallow content and/or the separation of tallow and/or fat from materials, particularly for foods used for human consumption, including fresh, uncooked meats, and in particular beef. Applicant has made numerous contributions to the processing of beef, and in particular to the separation of fat from beef to produce beef products having a desired content of fat, including processes that perform decontamination of the beef with such separation. The following applications are expressly incorporated herein by reference in their entirety: U.S. application Ser. No. 13/024,965, filed on Feb. 10, 2011; Ser. No. 12/968,045, filed on Dec. 14, 2010; Ser. No. 12/520,802, filed on Jan. 12, 2010; Ser. No. 13/024,178, filed on Feb. 9, 2011; Ser. No. 11/720,594, filed on Apr. 30, 2009; Ser. No. 12/697,592, filed on Feb. 1, 2010; Ser. No. 13/422,740, filed on Mar. 16, 2012; Ser. No. 13/355,953, filed on Jan. 23, 2012; Ser. No. 13/324,744, filed on Dec. 13, 2011; and Provisional Application No. 61/595,537, filed on Feb. 6, 2012.

In one embodiment, the use of fluids including water and/or carbon dioxide may contribute to the depletion of micronutrients from the beef. Micronutrients are generally regarded as compounds necessary to perform a whole host of physiological processes in a human being. Micronutrients are not necessarily manufactured by the human body, and therefore, the depletion of micronutrients from a food item may not be desirous. Disclosed herein is a process for the separation of lean from fat, and optionally, the production of tallow and lean finely textured beef [LFTB], from boneless beef.

In one embodiment a method is disclosed. The method includes reducing the size of boneless beef by slicing and dicing equipment into small pieces of approximately several inches. Pieces of beef of this size, especially when the boneless beef is leftover trim remaining after the carcass has been processed to remove the more valuable primal sections, may generally also contain fat. The method includes reducing the temperature of the pieces of beef with fat to a temperature causing solidification of the fat, and to a brittle condition so that when a crushing action is applied to the temperature-reduced pieces of beef, the crushing force is sufficient to cause fracturing and the substantial disintegration or fragmentation of the fat matter into small fat particles or fragments that readily fall away from the beef, but without significantly damaging the lean matter. This "bond breaking" process has been described in one or more of the above-referenced applications. The temperature-reduced and crushed stream of fat and lean particles can then be transferred to a separator.

In one embodiment, separation is by way of buoyancy, which relies on using the different densities of fat and lean as a way of achieving separation. In an enclosure, the fat particles and the leftover lean particles are combined with a fluid of a density greater than the fat, such that the fat particles are caused to rise to the surface in the fluid, and the lean particles are caused to sink or at least remain separate from the fat particles. The fat particles can then be collected and processed, such as rendering, to produce essentially pure tallow (glycerides), and lean finely textured beef (LFTB). Alternatively, the fat particles being dimensionally smaller than the lean particles, and while still in a substantially solid condition, can be separated using a vibratory sieve of a mesh size that may permit some, most, or essentially all of the fat particles to pass through, while the lean particles do not pass through. The selected mesh size can determine the fat content remaining with the lean particles, and is a means of controlling the beef product fat content. A vibratory sieve can separate a portion of the fat particles while agitating and shaking the larger lean pieces so as to cause even more fat particles to separate from the larger lean pieces.

If separation by buoyancy is practiced, the fat particles and larger lean pieces can be combined with a fluid that comprises water, with or without carbon dioxide. Carbon dioxide can be used with water to form carbonic acid. The beef and the fluid are agitated in a vessel to allow temperature equilibration above the freezing point of water. Since the temperature of the beef has been reduced to allow for the breaking away of the fat, the beef particles can be frozen, or partially frozen. The beef particles comprise relative lower amounts of less dense (fat) and higher amounts of more dense (lean) matter, which includes a greater quantity of frozen water. The water in the lean matter can be partially frozen, and the overall density of the lean particles is initially lower. When the water partially unfreezes, an increase in density is experienced, and then, the lean particles can start to settle to the bottom of the fluid, and the fat particles that are predominantly tallow and fat can rise toward the surface of the fluid. The separated matter comprising predominantly lean can be removed from the fluid as a reduced tallow and fat content beef product. Both separation by buoyancy with a fluid and a vibratory sieve can be practiced, in any order, or alternatively, and for as many times to achieve the desired level of separation. The method can be practiced with any material containing fat, not just beef, including plant and animal materials.

The method may further include emulsifying the fat particles into an emulsification of oily material and solids, pasteurizing the oily material through the application of heat, and centrifuging the emulsification to separate solids from the oily material. The method may further include combining the solids with the lean particles. The method may further include combining the lean particles with a measured amount of the fat particles, after the fat particles have been separated from the lean particles. The method may further include treating the lean particles under reduced pressure to adjust water content and lower the temperature of the beef product to produce a controlled water content beef product. The method may include treating the lean particles, after separation of the fat particles, with supercritical carbon dioxide (carbon dioxide above the critical temperature and pressure). The method can include centrifuging the lean particles with fluid in a centrifuge to separate fluid from the lean particles. The fluid can be dehydrated, and some dehydrated fluid is returned to the lean particles. The remaining fluid can be treated with ultraviolet C radiation, temperature-reduced, and recycled to use as the buoyancy fluid in the separation vessel.

The fluid may comprise filtered, clean water, or carbon dioxide and water, carbonic acid (or liquid carbon dioxide), or any suitable organic acid such as ascorbic acid, acetic acid, per-acetic acid, acidified sodium chlorite. Additionally, or alternatively, the fluid may comprise an alkaline agent. The fluid can be clean, potable water or other fluids or a combination of fluids with agents. Fluids may include water, or fluid carbon dioxide, or both. The fluid may further include acids, either organic or inorganic, and alkaline agents. Acids include, but are not limited to carbonic acid (water and carbon dioxide), lactic acid, ascorbic acid, acetic acid, citric acid, peracetic acid also known as acid ($CH_3CO_3H$). Alkalinity of the fluid may be raised by adding an alkali substance, such as ammonia, ammonium hydroxide, sodium hydroxide, potassium hydroxide, calcium hydroxide, tri-sodium phosphate, and any other suitable alkali. Additives such as sodium chloride, sodium chlorite, and sodium hydroxide may be added which can be followed by addition of a suitable acid (to provide acidified sodium chlorite).

In one embodiment, the separation fluid, including water, can be saturated so as to minimize the dissolution of micronutrients from the lean into the fluid.

In one embodiment, the separation fluid can include the use of "serum," which becomes saturated with blood corpuscles, sodium chloride, iron and many, if not all of, the micronutrients contained in the lean particles being separated. The fluid can be treated in an enclosed conduit in which UVc sources are fitted and positioned close enough together to ensure thorough penetration of the fluid and to contact any organisms contained therein so as to sterilize the organisms thereby preventing reproduction.

The serum is obtained by combining clean potable water with the beef particles and allowing the liquids present in the beef to mix with the water until the water is saturated and comprises fluid, which is virtually identical to the typical fluid present on the surface of freshly cut beef.

The use of a saturated fluid as described herein can minimize or reduce the loss of micronutrients from the lean and/or the fat particles.

In one embodiment, a method for separating fat from lean while minimizing the loss of micronutrients from the lean is disclosed. The method includes combining a mixture of fat particles that are a majority of fat, and lean particles that are a majority of lean, with a saturated aqueous fluid, wherein a density of the fluid is greater than a density of the fat particles, and wherein the fluid is saturated with one or more components found in beef prior to being mixed with the particles. The method includes collecting the fat particles separate from the lean particles by causing the fat particles to rise in the fluid, and collecting the lean particles.

The method may include, before combining with the fat particles and the lean particles, saturating the fluid by combining water with beef particles, and allowing the liquids present on the beef to mix with the water.

The method may include allowing the water to comprise components that are found in beef at approximately the same concentration.

The method may include a fluid that is saturated with a salt.

The method may include sodium chloride.

The method may include a fully saturated fluid.

The method may include a fluid saturated with micronutrients.

The method may include treating the saturated fluid by irradiation with UVc energy before combining with the particles.

The method may include collecting the lean particles and fluid, separating the fluid, dehydrating the separated fluid, and combining dehydrated fluid with the lean particles.

The method may include emulsifying the fat particles to produce solids, converting the fat particles into oil, pasteurizing the oil and solids together by the application of heat, and separating the solids from the oil.

The method may include a partially saturated fluid.

The method may include a fluid having one or more components naturally found in serum of fresh beef.

The method may include a fluid that resembles serum of fresh beef with respect to the type of components found in the serum.

The method may include a fluid that resembles serum of fresh beef with respect to the quantity of components found in the serum.

The method may include one, more than one, or all of the above features.

DESCRIPTION OF THE DRAWINGS

The foregoing aspects and attendant advantages will become more readily appreciated as the same become better understood by reference to the following detailed description, when taken in conjunction with the accompanying drawings, wherein:

FIG. 3A is a schematic illustration of a process for the separation of lean from boneless beef containing lean and tallow, including equipment for separation, centrifugation, and collection of fat and lean particles;

FIG. 9 is a diagrammatical illustration of ultraviolet apparatus to treat fluids;

FIG. 10 is a diagrammatical illustration of ultraviolet apparatus to treat fluids;

FIG. 11 is a diagrammatical illustration of ultraviolet apparatus to treat fluids;

DETAILED DESCRIPTION

The term "fat" as used herein can mean fat and tallow when used in reference to animal matter. Throughout the description "beef" may be used as a representative material that can be used in the disclosed methods. However, it is to be appreciated that the disclosed methods can be practiced not only on beef, but on any meat, such as from poultry, pork, seafood, and the like.

The disclosed method is a process for the processing of beef and, specifically, a process for separating lean and fat from boneless beef and producing a product of specified fat content, and treating the products to deactivate and/or destroy pathogens. However, the beef need not be boneless. In one embodiment, beef with bone fragments may also be processed in accordance with the disclosure. The disclosed apparatus and method may result in the production of boneless diced beef of specified fat content, tallow and lean finely textured beef (LFTB) from a single source of boneless beef, including what is commonly referred to as 50's, 30's, and XF's. These designations pertain to leftover trim, after the removal of the primals from an animal carcass. The leftover trim is usually collected and graded based on the approximate fat content, such that 50's are approximately 50% fat, 30's or XF's are approximately 30% fat or less. However, higher fat content boneless beef can be used as the starting material in the process. The produced LFTB comprises the connective tissue, water, cell walls, protein, and has a lean content of about 90% or greater, and the balance is fat.

Figure 1:
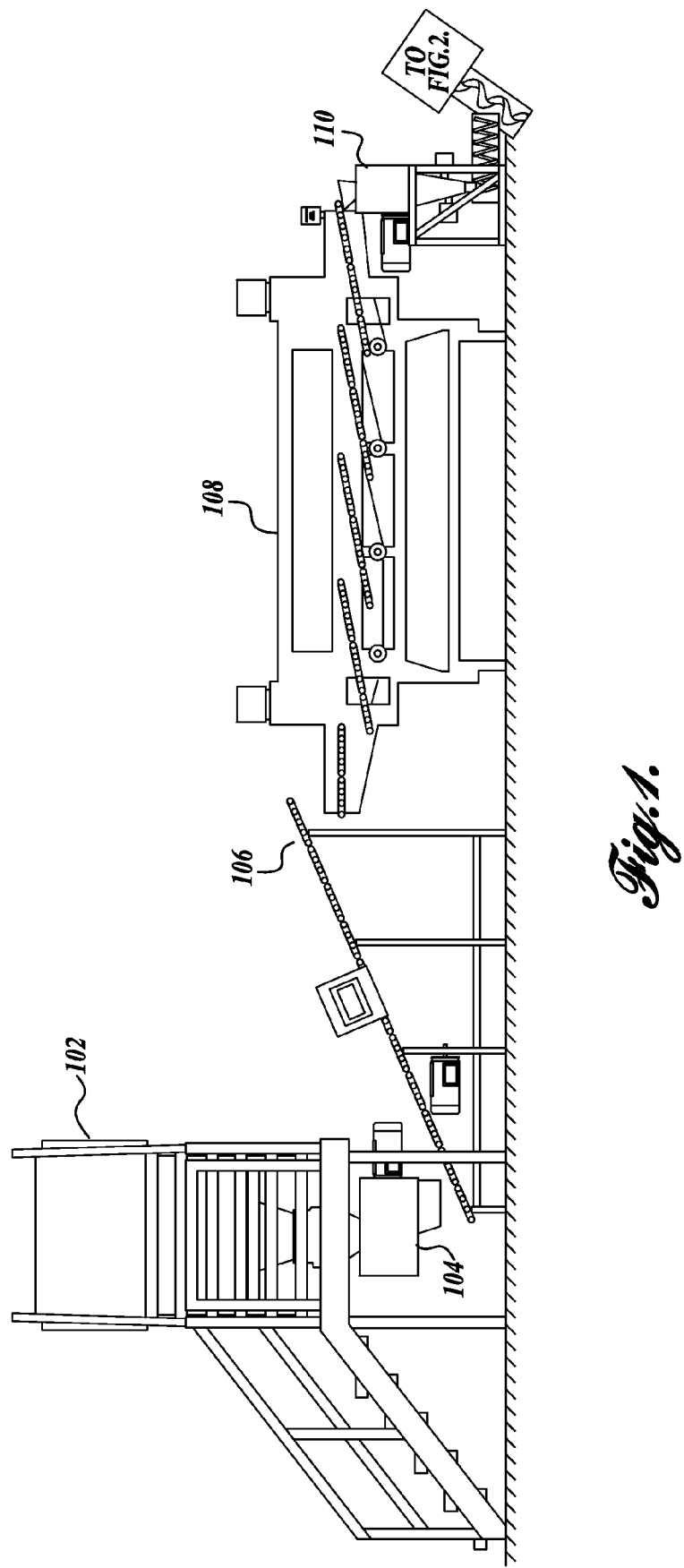
FIG. 1 is a schematic illustration of a process for the separation of lean from boneless beef containing lean and tallow, including equipment for dicing, chilling, and bond-breaking.

FIG. 1 illustrates the first steps in the process of separating the lean from animal matter that is a combination of fat and lean matter. A representative animal matter may be high fat trim byproduct from beef slaughterhouses. Generally, the animal matter is any boneless beef. In one embodiment, the source materials can comprise a combination of what is commonly known as 50's, 65's, 75's boneless beef, or even XF's, and/or any other suitable boneless beef. However, in other embodiments, the beef may include bone and cartilage. All materials coming in contact with the boneless beef or any parts thereof, such as lean and fat are made from food grade materials, such as stainless steel and suitable polymers, such as nylon, polyethylene, polypropylene, and the like. Furthermore processing equipment may be housed in an enclosed building within a cooled environment and, kept at a temperature near the freezing point of water. Also, instrumentation, such as temperature, level, pressure, flow, density, and mass meters, is provided where necessary to provide status of and/or maintain control of the product through the many components of the system.

The boneless beef, which may include sizable chunks, is loaded onto hopper 102. Hopper 102 represents a vat dumper that may unload any quantity of animal matter containing fat and lean, such as for example, the unloading of containers of approximately 2,000 lb of beef followed by size reduction equipment, such as slicing device 104. From hopper 102, the beef is fed by gravity to a slicer 104.

The slicing device 104 is designed to slice and dice the beef and reduce beef to a size, for example, of about 1 inch in cross section by 2 inches or less. While not limiting, the small pieces are size reduced to approximately not more than about 1 inch wide and 2 inches long strips or 2 inch cubes. Generally, it may be advantageous to increase the size such that the surface area to volume ratio is minimized, since less surface area may mean less contact area with a separating fluid. When boneless beef comes in contact with such separating fluid, it may be possible that the removal and depletion of micronutrients from the boneless beef into the fluid may occur.

The individual beef pieces of diced beef may still contain an amount of fat and an amount of lean. Slicing device 104 provides a steady flow of beef pieces to inclined conveyor 106.

The sliced and diced beef pieces continue along the inclined conveyor 106, and are delivered to the entry of a chilling tunnel 108. The chilling tunnel 108 is for chilling the beef to a temperature at which the fat may break off from lean through the application of pressure that breaks off fat from lean and produces particles that are either predominantly fat particles or predominantly lean particles. Processing of the diced beef pieces through the chilling tunnel 108 results in differences in temperature between the fat and the lean matter in each of the individual beef particles, such that the fat is at a temperature that renders the fat brittle, and prone to breaking, and can be separated from the lean by the application of pressure, similar to a crushing force that can break the fat free of the lean matter, and the lean is at a temperature that is pliable and does not result in the lean matter breaking free through the same application of pressure. However, in one embodiment, the lean matter can be chilled to a temperature at which water within the lean matter can freeze and expand, thus, reducing the density of such lean matter. For example, in one embodiment, the temperature of the beef pieces should be not more than, for example, 29° F. and not less than 0° F., or for example, about 15° F. to about 24° F.

The input temperature of the beef particles to the tunnel 108 may be about 32° F. to 40° F., but preferably about 32° F. The temperature of the beef before the tunnel freezer 108 may be controlled, in general, by adjusting the temperature of the room in which the beef is being diced. Owing to the differences of heat transfer between fat and lean in each beef piece, and respective amounts of water in lean versus fat matter, the chilling tunnel 108 results in different temperatures of fat and lean within each beef piece.

It has been realized that the temperature of the individual pieces that exit the chilling tunnel 108 is not uniform throughout the particles. Because of the different heat transfer rates of fat and lean as well as the different percentages of water within lean and fat, the temperature of the lean may be higher than the temperature of the fat, even of the same piece. The temperature reduction is carried out to result in lean matter that remains flexible due to the cohesive properties of muscle tissue, while the fat is cooler at the surface and is in a brittle and friable condition due to the lower temperature. However, because the lean contains greater amounts of water than fat, the water is frozen or partially frozen.

In one embodiment, flooding the tunnel 108 enclosure with 100% carbon dioxide gas displacing what would otherwise be air is advantageous. In this way, carbon dioxide gas can be recycled through evaporators. Another purpose in the use of carbon dioxide is to displace air (and therefore atmospheric oxygen), thereby inhibiting the formation of oxymyoglobin from the deoxymyoglobin exposed at the cut lean surfaces of each dice or beef particle when diced or sliced.

The temperature of the quickly frozen beef particles when exiting the tunnel 108 is controlled such that lean matter comprising substantially muscle striations, may freeze the water and all naturally-occurring fluids. Water represents about 70% of lean matter, and thus the freezing and expansion of water when frozen contributes a significant increase in volume with a corresponding decrease in density of the lean matter, such that the overall density is reduced. The beef pieces are in a solid phase but in such a way that the physical characteristics and properties of the lean matter is pliable and "rubbery" in texture, while the fat matter is friable such that it fractures when subjected to compressive and twisting actions and may crumble readily into small particles and be freed from the lean matter. The temperature to which the beef pieces are reduced needs to alter the physical condition of the beef pieces so as to facilitate the flexing of the muscle striations of the lean matter without causing it to fracture and break into smaller pieces, while simultaneously rendering the fat matter friable such that it may fracture, crumble, and break into smaller separate particles. In this way, the friable fat having broken away from the lean when it is flexed, crushed, bent, or twisted, thereby reduces the fat matter into small separated particles. Hence, these are referred to herein as fat particles. The beef pieces remaining after fat is broken off are relatively larger comprising mostly lean matter (because they are generally not broken into small particles). Hence, these are referred to herein as lean particles. The change in physical breakdown of the diced beef pieces into two types of particles is caused by lowering the temperature thereof followed by physical disruption of the bond that fixes the fat and lean matter together in an attached state and results in a size difference between the larger lean particles compared to smaller fat particles.

The chiller 108 may be a cryogenic freezer using nitrogen or carbon dioxide as the refrigerant, such that upon transfer out of the chiller 108 (or other style of freezer) the temperature of the fat (at its surface) is lower than the temperature of the lean in each particle or separate piece of beef. In one embodiment, the diced beef pieces are temperature reduced by transfer through chiller 108 such that the surface temperature of the fat matter becomes lower (approximately 5° F.) than the surface temperature of the lean matter, which can be about 29° F. to 24° F., immediately following discharge from the freezer. The temperature at the surface of fat may be about 5° F. or less and up to 10° F. or more such that it can be friable and crumble upon application of pressure, while the temperature of the lean may be 16° F. to about 34° F., for example, or alternatively below 29° F., which makes the lean flexible and not frozen into a "rock-hard" condition immediately after removal from the freezing process.

At the exit of the chilling tunnel 108, the temperature-reduced beef pieces are crushed between rollers in the bond-breaking device 110. The bond-breaking device is for reducing the size of diced and chilled beef pieces into particles, wherein the particles that result are either predominantly fat particles or predominantly lean particles. Bond-breaking device 110 includes one or more pairs of opposed rollers, wherein teeth are disposed along the longitudinal direction of each opposed roller. Individual teeth can run the length of the roller. The intermeshing teeth are in close, but not touching proximity with the teeth of the opposed rollers. The diced and chilled beef pieces leaving the tunnel chiller 110 are deposited by gravity into the gap between the rollers of the bond-breaking device 110. Processing in the bond-breaking device 110 results in the liberation of the fat from the beef pieces, thereby resulting in fat particles and lean particles, that formerly comprised the fat particles. Rollers that contact the beef pieces can be smooth or comprise teeth extending the length of the roller. The gap between opposing teeth can be determined based on the size of the fat particles that come from the outlet of the bond-breaking device 110. If the fat particles are too large, the spacing between the opposed rollers can be decreased to reduce the size of fat particles. If the fat particles are too small and/or lean is combined with the fat, then the spacing of the intermeshing teeth can be increased.

The temperature reduced beef pieces can be, without storing in containers or otherwise that could allow temperature equilibration of the fat and the lean matter, or on an extended conveyor, transferred through the bond breaking process during which the beef pieces are "flexed" or bent by distortion and partially crushed as they are transferred between, for example, a pair (or two pairs) of parallel opposed rollers manufactured from any suitable stainless steel, such SS316 or SS304 grades, but wherein the beef pieces are not completely flattened as would occur if placed on a hard surface and rolled upon with a very heavy roller (steam/road roller for example). This bond breaking compression process is intended to cause breakage of the friable fat matter into smaller pieces of, in the majority of instances, approximately 100% fatty adipose tissue (fat) and smaller than the fat matter was before transfer through the bond breaking process and much more so than the lean matter, which remains in most cases intact but without any more than about 10% fat, or less, remaining attached to the majority of lean matter after transfer through the bond breaking process. In other words, the fat in the beef pieces may "crumble", fracture, and break into small pieces and separate from the lean in a continuous stream of what becomes small (smaller than before transfer through the crushing process) fat particles and lean particles that still comprise some fat, but are approximately more than 90% lean.

Figure 2:
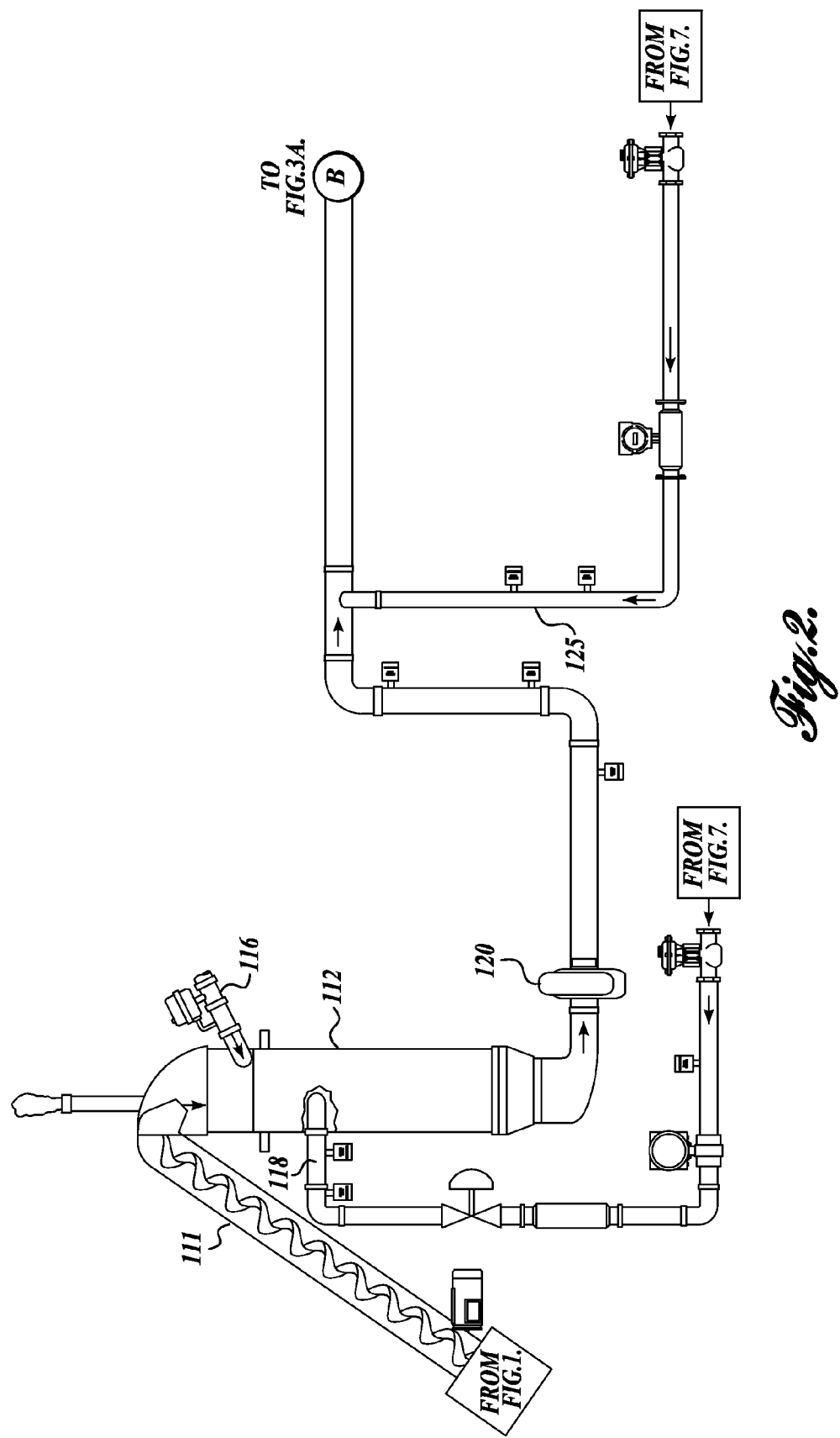
FIG. 2 is a schematic illustration of a process for the separation of lean from boneless beef containing lean and tallow, including equipment for combining fluid with fat and lean particles.
Figure 2A:
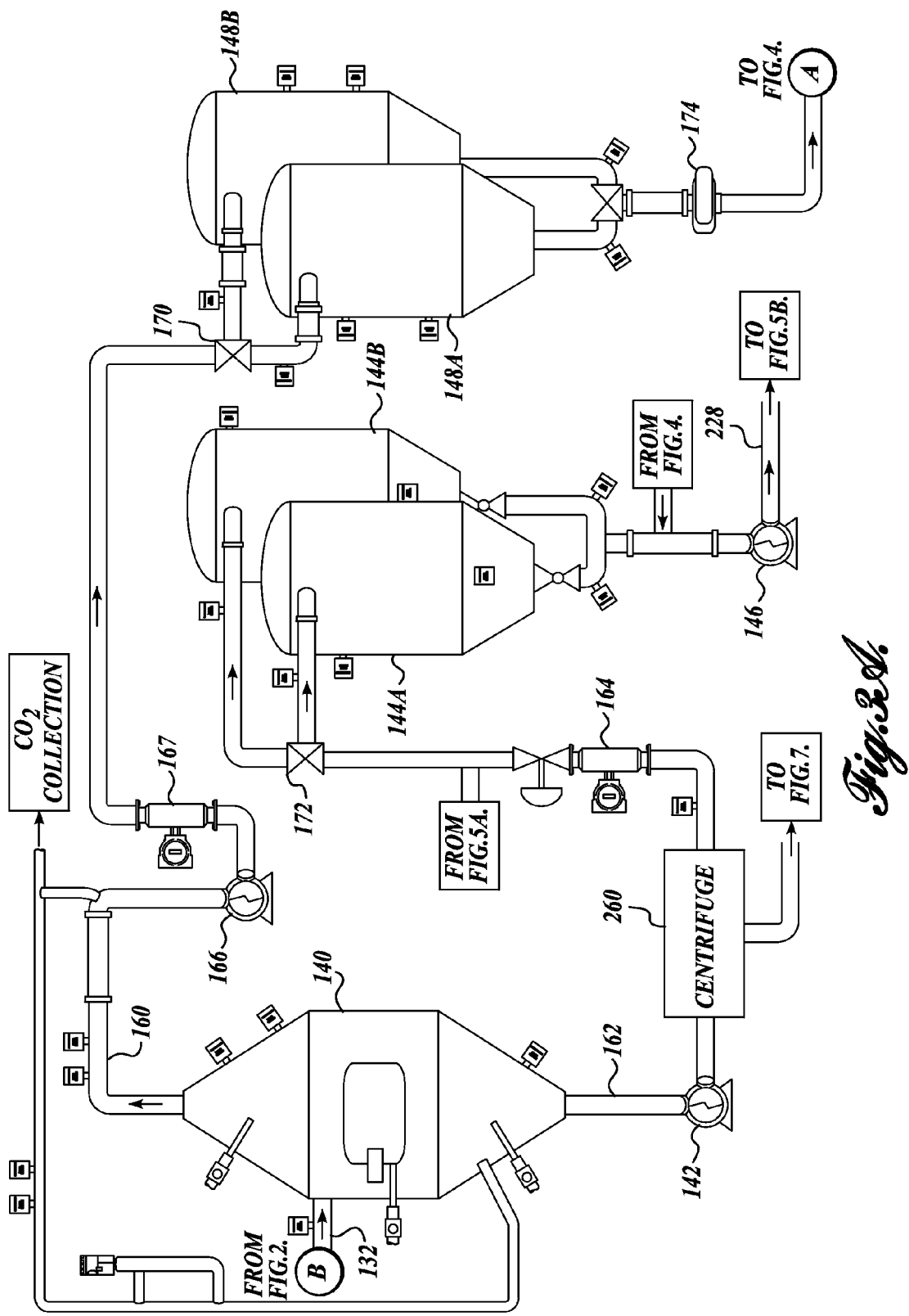

In one embodiment, the fat particles and the lean particles exit the bond-breaking device 110 and are deposited to an enclosed screw conveyor 111, which is shown in FIG. 2. In another embodiment, the liberated fat particles and the larger beef pieces may be deposited onto a vibratory sieve of a mesh size large enough for the fat particles to pass through, but not the larger lean particles, as a means of separating the fat particles from the lean particles. The lean particles that do not pass through the sieve are then returned to enclosed screw conveyor 111, while the fat particles that fall through the sieve are processed in a low temperature rendering section described below. In other embodiments, a sieve can be a rotating sieve, or a sieve having a plurality of different sieve meshes to separate more than two size ranges of particles, for example.

Referring to FIG. 2 again, and if a vibratory sieve as not used for separation, the inclined screw conveyor 111 deposits the mixture of beef particles and the fat particles into the combining tube 112. The combining tube 112 is a vertically situated vessel that is essentially at atmospheric pressure, or slightly above. The combining vessel 112 is for combining fluid with the lean particles and the fat particles. In one embodiment, the fluid to the combining tube is saturated with components that are naturally found in beef "Saturated" may mean partially saturated or fully saturated, unless specifically stated otherwise. The amount of components in the fluid can approximate the amount naturally found in beef and liquids found in beef. Furthermore, the addition of salts or other components may also be added to the fluid, so as to mimic the naturally occurring fluids in beef. In this manner, artificial "serum" is produced that is in many respects similar to the naturally occurring liquids in beef. The purpose of using a saturated fluid is to reduce the amount of micronutrients that would possibly be removed from the lean, if pure water is used as the combining fluid. The saturated fluid is further described below in connection with FIGS. 7, and 8.

The fluid, whether saturated with beef components or not, may include water, water with an acid, such as that created by the addition of carbon dioxide, or water with an alkaline compound, or a combination of acids and alkaline agents.

In one embodiment, the temperature of the fluid (suspension or buoyancy medium) should not be less than about 40° F. and not greater than about 60° F., for example, at about 50° F., before being mixed with the lean particles and fat particles.

Carbon dioxide gas may be introduced into the combining tube 112 via a metering valve 116. The combining tube 112 includes an inlet 118 for the introduction of fluid from vessel 250 of FIG. 7. The amount of fluid is measured and metered according to the amount of solid material supplied to the combining tube 112. The solid material, including fat particles and lean particles can be measured via the use of a Coriolis meter. Additionally, the flow, pressure, and temperature of the fluid can also be metered. The fluid is introduced through a conduit 118 placed substantially at a tangent to the exterior of the vessel 112. The energy imparted by the fluid creates a vigorous mixing action of the beef and fat particles, carbon dioxide, and fluid. Carbon dioxide in the presence of water produces carbonic acid. Sufficient carbonic acid may be introduced into the vessel 112 so as to create a low pH fluid having a pH less than neutral. In one embodiment, the pH can be less than 4. In one embodiment, the pH can be less than 3. In one embodiment, the pH of the aqueous medium in the combining tube 112 is less than 2. The ratio of the fluid to beef and fat particles is on the order of five times the mass of the fluid compared to the mass of fat and beef particles. In some embodiments, the ratio of the fluid to fat and beef particles is on the order of equal mass parts fluid compared to the mass of the fat and lean particles. In any event, the amount of fluid added is sufficient to fluidize the fat and beef particles, such that all surfaces of the fat and beef particles can come in contact with the low pH fluid. In cases of insufficient fluid, the beef and fat particles may compact tightly against one another, such that surfaces of the beef and/or fat particles are not exposed to the low pH fluid. An advantage of fluidizing particles is to expose all surfaces of the beef and fat particles to low pH fluid such that some biocidal effect is realized by such contact.

The temperature of the fluid may be above or slightly above the freezing point of water, or higher. As discussed above, the beef particles include water, which may be slightly frozen such that the density of the beef particles is reduced by expansion of the frozen water within the beef particles. Preferably, the frozen condition of the water within the beef particles is maintained, at least, for a part of the process, for example, until the separation step occurring later in the process.

Additionally and/or alternatively, an alkaline agent, or additional acids may be combined with the fluid in the combining tube 112.

From combining tube 112, the fluid containing beef particles and fat particles and, optionally, an acid and/or an alkaline agent is transferred via a variable-speed pump 120.

Pump 129 pumps the medium containing fat particles and lean particles to a separator 140 in FIG. 3A. Prior to separator 140, the fluid containing fat and lean particles can be measured via Coriolis meter. A Coriolis meter measures the mass flow of fat and lean particles, as well as the fluid and the respective densities.

In general, separation of the fat particles from the lean (having some fat) particles is done by way of buoyancy separation in a fluid that has a density lower than that of the lean particles, when the water in the lean particles is not frozen. The density of the fluid can be adjusted by adjusting the temperature, or the addition of agents. Separation may also be conducted with a fluid that has a density greater than that of the fat particles. Separation may also be conducted with a fluid that has a density in the range between the fat particles and the lean particles. The fluid density can be adjusted by changing the temperature, and/or through the addition of salts, acids, or alkaline agents. At the temperatures required for bond breaking discussed above, when the fluid is first mixed with the lean and fat particles, the particles may float including the lean particles, and be suspended at the uppermost space available in the fluid and just below a surface of the fluid or suspended within the fluid. The temperature of the fluid can be higher than the temperature of the fat and the lean particles. As the temperature of the fluid and fat and lean particles begins to equilibrate, which involves the initial lower temperature of the lean particles increasing, corresponding with the decreasing temperature of the fluid, the buoyancy of the lean particles may start to "fail" until the lean particles sink toward the base of the fluid leaving the fat particles floating at the fluid surface or the uppermost available space in the fluid. An increase in the density of the lean particles is seen as the water in the lean thaws, which reduces the volume of lean particles and correspondingly increase in density. Fat having a lower content of water does not experience as great an increase in density due to water thawing. As the temperature of the fluid is greater than a temperature of the lean particles, and the fluid density is adjusted to provide a predetermined proportion of lean particles to sink in the fluid, the fat and lean particles are allowed to rise or fall in the fluid in accordance with their density, while the temperature of the lean particles equilibrates with the temperature of the fluid, and increases the density of the lean particles, which facilitates separating the fat particles from the lean particles to produce a beef product low in fat.

The method may use a fluid wherein the density is greater than 55.0 lbs/cubic foot and less than 66.0 lbs/cubic foot, for example. However, other ranges of fluid density are suitable, and the density of the fluid may be adjusted up in order to allow a greater amount of fat to be carried into the fat product stream, or the density of the fluid may be adjusted down in order to allow a greater amount of fat to be carried into the lean product stream. Alternatively, the density of the fluid may be adjusted up in order to allow a lesser amount of lean to be carried into the lean product stream, or the density of the fluid may be adjusted down in order to allow a greater amount of lean to be carried into the lean product stream.

In one embodiment, before and during the lean particles and fat particles have reached equilibrium with the fluid, any bone chips that may be present may sink when mixed together with the fluid, thereby providing a convenient means of separating bone chips first, which may be arranged to occur immediately after blending the lean and fat particles with the fluid and before temperature equilibration of the particles or when the lean particle temperature has increased so as to thaw the lean/water content of the lean matter upon which shrinkage of the lean may occur causing it to sink in the fluid. The fat particles, frozen or not, may remain floating at the fluid surface. By lowering the fluid temperature relative to the temperature of the lean particles, complete thawing and temperature equilibration may be delayed and, accordingly, the lean particles may remain suspended for a longer period.

Generally, the particles higher in density may be those containing the greater amount of lean, while the particles lower in density may be those containing all or substantially all fat. The fluid is adjusted by either controlling the temperature and/or the density so as to provide a difference in density between particles.

In one embodiment, the fluid containing a mixture of fat and lean particles enters a separation vessel 140 at a tangent to the vessel. While a specific configuration of a vessel is illustrated, it is to be appreciated that other designs are possible including horizontally disposed conduits with two or more branches that differ in elevation, so that the lighter particles that float may collect, and be carried within the higher branch, and the heavier particles that sink may collect, and be carried within the lower branch In one embodiment, the separation vessel 140 may be described as a dual-cone vessel having a cylinder connecting an upper cone with a lower cone. The small diameters of the upper and lower cone portions face away from the cylinder, such that the larger diameter sections of the cones face toward the center cylindrical section of the vessel 140. The separation vessel 140 is filled with a fluid, such as an aqueous medium. Recycled fluid in conduit 125 from vessel 250 of FIG. 7 may be combined with the fluid mixture from the combining tube 112. The separation vessel 140 allows separation between those particles higher in density through the lower cone section of the vessel 140 and the particles of lesser density through the upper cone section of the vessel 140. The vessel 140 includes a conduit 160 connected to the uppermost part of the upper cone section of the vessel 140. The conduit 160 withdraws fluid containing fat particles. Particles tending to be higher in density contain mainly lean, while particles being of lesser density contain mostly fat and are transferred through the upper outlet of the vessel 140 through conduit 160, which includes a pump 166 and a Coriolis meter 167.

The lower cone section of the vessel 140 collects and withdraws fluid containing the lean particles via conduit 162. Conduit 162 leads to a pump 142, which pumps the fluid containing mainly the lean particles to a centrifuge 260. The centrifuge 260 then separates fluid from the solid lean particles. Various types of centrifuges are useful for this purpose, such as a decanter-style centrifuge, a disk centrifuge, or a basket centrifuge, for example.

The lean particles from the centrifuge travel through a Coriolis meter 164 for massflow measurement. The lean particles are then stored in either of reservoir vessels 144a or 144b. Vessels 144a and 144b rest on load cells that determine when a vessel is filled to capacity. Only one vessel 144a or 144b is generally loaded with material at a time. When the vessel reaches capacity, a transfer valve 172 may automatically switch to load the empty vessel. While one vessel 144a or 144b is being filled, the standby vessel may be emptied of material to be ready to receive material when the other vessel is filled to capacity. The bottom outlets of the vessels 144a and 144b share a common outlet to a pump 146. Pump 146 transfers the lean particles to a vessel, such as one illustrated in FIG. 12 that is for the purpose of treating the lean with supercritical carbon dioxide to reduce pathogens, and will be described later. However, other methods for treating the lean particles to reduce pathogens are possible. It can be advantageous to reduce pathogens from the lean separate from the fat, since the fat may undergo pasteurization through heating, while heat may detrimentally affect the quality of raw beef. The fluid separated from the centrifuge 260 is sent to the vessel 250 of FIG. 7.

Returning to the separation vessel 140, the fluid and fat particles are withdrawn from the top of the upper cone section of the vessel 140 through conduit 160. Conduit 160 enters pump 166. Pump 166 transfers the aqueous medium containing fat particles via a mass flow meter 167 and then onto fat reservoir vessels 148a and 148b. The fat in vessels 148a and 148b may contain approximately 15% water and 10% to 15% by weight protein. This protein may be recovered in the low temperature rendering section of FIG. 4, and reintroduced to the lean in vessels 144a,b.

Vessels 148a and 148b rest on load cells, which determine when a vessel is filled to capacity. Only one vessel 148a or 148b is generally loaded with material at a time. When the vessel reaches capacity, a transfer valve 170 may automatically switch to the empty vessel. While one vessel 148a or 148b is being filled, the standby vessel may be emptied of material to be ready to receive material when the other vessel is filled to capacity. The bottom outlets of the vessels 148a and 148b share a common outlet to a pump 174. Pump 174 transfers the aqueous medium and fat particles to a low temperature rendering system illustrated in FIG. 4, further described below.

Prior to or after the fat and lean particles are sent to their respective vessels, a process may be conducted to combine a measured amount of lean particles with a measured amount of the fat particles, after the fat particles have been separated from the lean particles. The fat content of the lean particles, and the fat particles, can be measured via the use of Coriolis meters, and addition of fat can be undertaken to raise the fat content of the lean product stream to a desired level. This can be done by transferring fat from the vessels 148a,b to the lean product stream as it is being transferred into or out of vessels 144a,b. The fat content of the lean product stream may then again be measured to verify the level of fat.

Figure 3B:
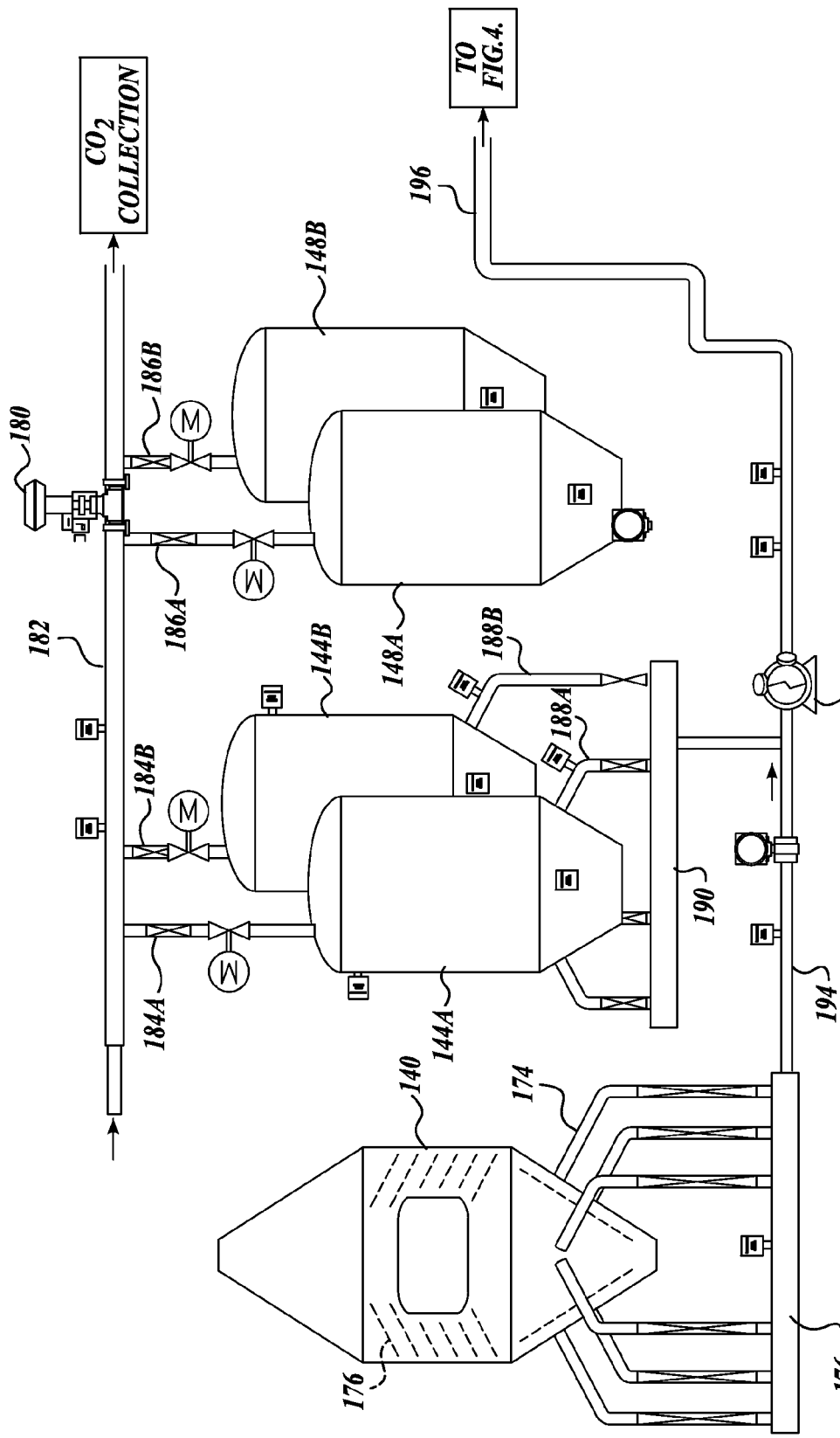
FIG. 3B is a schematic illustration of a process for the separation of lean from boneless beef containing lean and tallow, including equipment for the collection of fluid.

Referring to FIG. 3B, fluid collection from the separation vessel 140 is illustrated. The separation vessel 140 is optional, and may not be used when the centrifuge 260 is used. The separation vessel 140 includes a series of interior plates 176 placed at an angle with respect to the interior wall such that dense particles may easily slide down the plates and then into an annular space surrounding the interior wall, which eventually leads to the bottom of the lower cone section of the vessel 140, and out through conduit 162 described above. A series of fluid collection pipes 174 are placed around the circumference of the lower cone section of the vessel 140. The fluid collection pipes 174 may have filters that prevent particles from being entrained within the fluid collection pipes 174. All fluid collection pipes of vessel 140 lead to a fluid manifold 176. The fluid manifold 176 receives the fluid from the one or more collection pipes 174. The manifold 176 leads to conduit 194.

Fluid in conduit 194 is pumped by pump 178. It should be noted that product storage vessels for lean 144a,b may also be of a design that allows the collection of fluid with an interior perforated annular wall. The combined fluid from the separation vessel 140, and the lean vessels 144a,b is then transferred to a disk centrifuge 172 for collection of any solids.

The lean reservoir collection vessels 144a and 144b similarly include fluid collection pipes 188a and 188b connected to lower cone sections of the vessels 144a and 144b. The fluid collection pipes 188a from vessel 144a and the fluid collection pipes 188b from vessel 144b combine in the manifold 190. Fluid connected in the manifold 190 is pumped via pump 178 and combined with the fluid from the separation vessel 140. The combined fluids are sent via a combined conduit 196 into the disk centrifuge 172 for collection of any solids that may have been carried with the fluid. The lean reservoir vessels 144a and 144b include respective vent pipes 184a and 184b, which connect to the carbon dioxide collection manifold 182. Similarly, fat reservoir vessels 148a and 148b include vent pipes 186a and 186b, respectively, connected to the carbon dioxide manifold 182. The carbon dioxide manifold is maintained at a desired pressure via the system pressure control valve 180.

Figure 4:
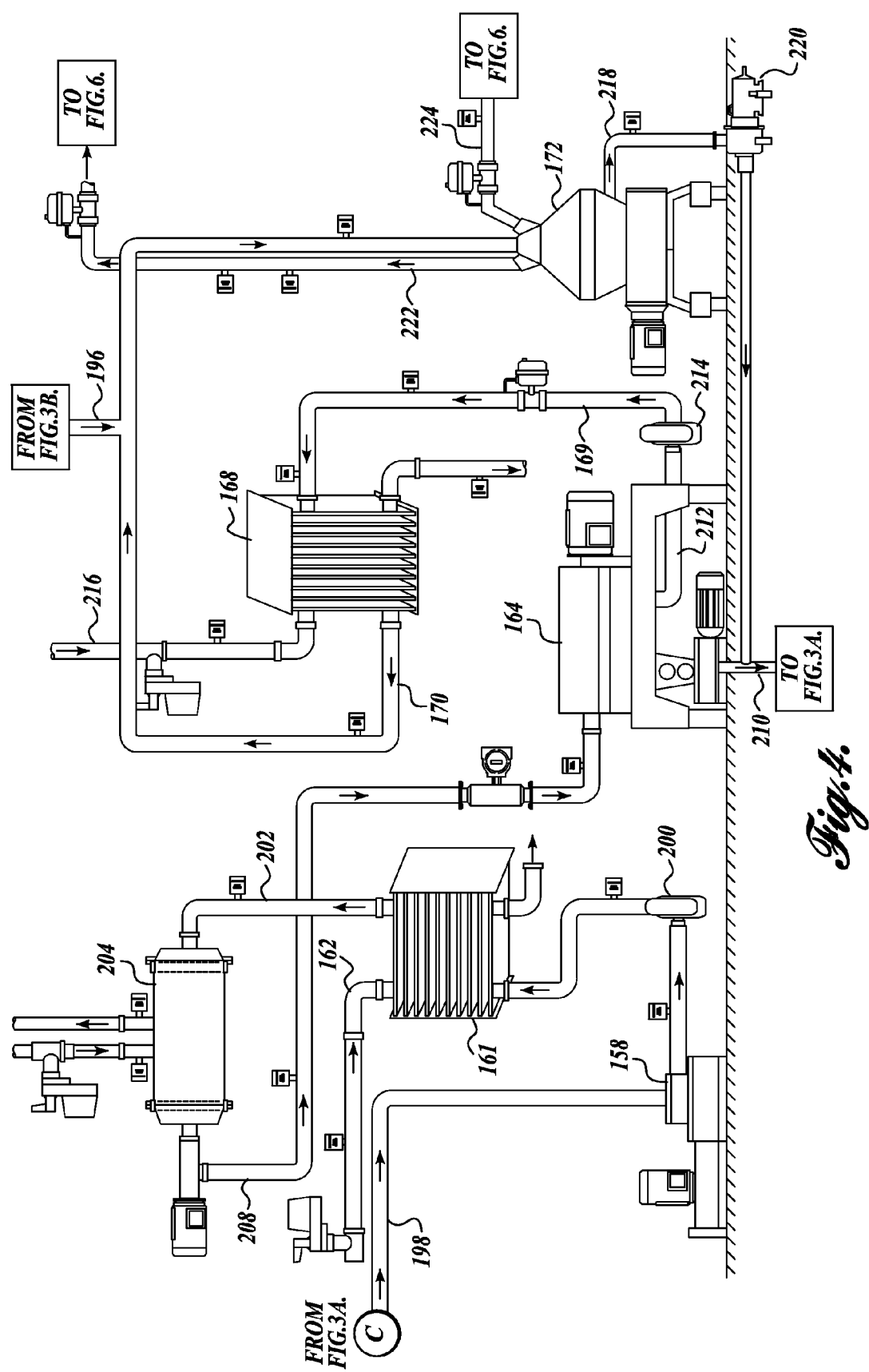
FIG. 4 is a schematic illustration of a process for the separation of lean from boneless beef containing lean and tallow, including equipment for the rendering of fat and production of tallow and lean finely textured beef (LFTB)

As described in connection with FIG. 3A above, the fat particles from the fat reservoir vessels 148a and 148b are transferred to a low temperature rendering system. This system is illustrated in FIG. 4. The fat reservoir vessels 148a and 148b are emptied by transferring the fat particles via the conduit 198. The conduit 198 leads into a variable speed emulsifier 158. Emulsifier 158 applies a shear force to the fat particles, generally by the application of a sharp rotating edge. The shear action breaks the walls of any fat cells to produce an emulsification of oily material and solids. The fat material is reduced to an emulsion that is then transferred via pump 200 to one side of a plate heat exchanger 161. Recirculating water is metered and temperature controlled to the plate heat exchanger 161 via conduit 162. The heated fat emulsification leaving the plate heat exchanger 161 through conduit 202 is approximately 108° F. to 180° F. The oily material may be pasteurized by the plate heat exchanger 161.

The fat emulsification transferred through conduit 202 enters a Votator scraped surface heat exchanger 204. In scraped surface heat exchange 204, the fat emulsification is further heated to approximately 160 to 190° F. The fat emulsification from scraped surface heat exchanger 204 is then transferred via conduit 208 to a decanter centrifuge 164. Decanter centrifuge 164 separates solids from the fat emulsification. The solids leaving the decanter centrifuge 164 may be considered lean finely textured beef (LFTB). This LFTB includes connective tissue, water, cell walls, and protein. This LFTB may be considered lean and typically has some fat with it. The solids (LFTB) leaving the decanter centrifuge 164 may be combined with the lean particles in the lean reservoir vessels 148a and 148b. Alternatively, the solids (LFTB) may be considered a separate product.

The decanter centrifuge 164 separates the fat emulsification via outlet 212. The fat emulsification at this point may be tallow, with the solids removed. The tallow removed via conduit 212 is pumped via pump 214 into conduit 169. Conduit 169 transfers the fat emulsification into a second plate heat exchanger 168. The second plate heat exchanger 168 heats the fat emulsification to approximately 160 to 190° F., and in any event the temperature is raised to pasteurize the tallow. Hot water is provided to the second plate heat exchanger 168 via the hot water recirculation system via conduit 216. The water is returned from the plate heat exchanger 168 to the hot water recirculation system. The tallow leaves the second plate heat exchanger 168 via conduit 170. Conduit 170 transfers the heated tallow into the disk centrifuge 172.

The disk centrifuge 172 separates further solids via outlet 218. Solids separated by the disk centrifuge 172 and transferred via conduit 218 are pumped via pump 220 and combined with the solids (LFTB) from the decanter centrifuge 164. The combined solids may be reintroduced into the reservoir vessels 144a and 144b containing the lean particles. Alternatively, the solids (LFTB) are packaged and considered a separate product. Water is separated from the disk centrifuge 172 via conduit 224.

The emulsifier 158 is used to break cell walls of fat to release oil. The solids including the cell walls are transferred with the solids, and may separate in the decanter centrifuge 164 and/or the disk centrifuge 172. The oil, which is essentially tallow, is separated from the disk centrifuge via conduit 222 and sent to oil storage vessels 230a,b of FIG. 6. The oil thus produced has many uses. Being food grade, the oil may be used in the manufacture of any type of food, such as snacks, used as commercial cooking oil, as a flavor additive, or any other application of a food-grade oil. Additionally or alternatively, the oil may be used in the production of biodiesel.

Figure 6:
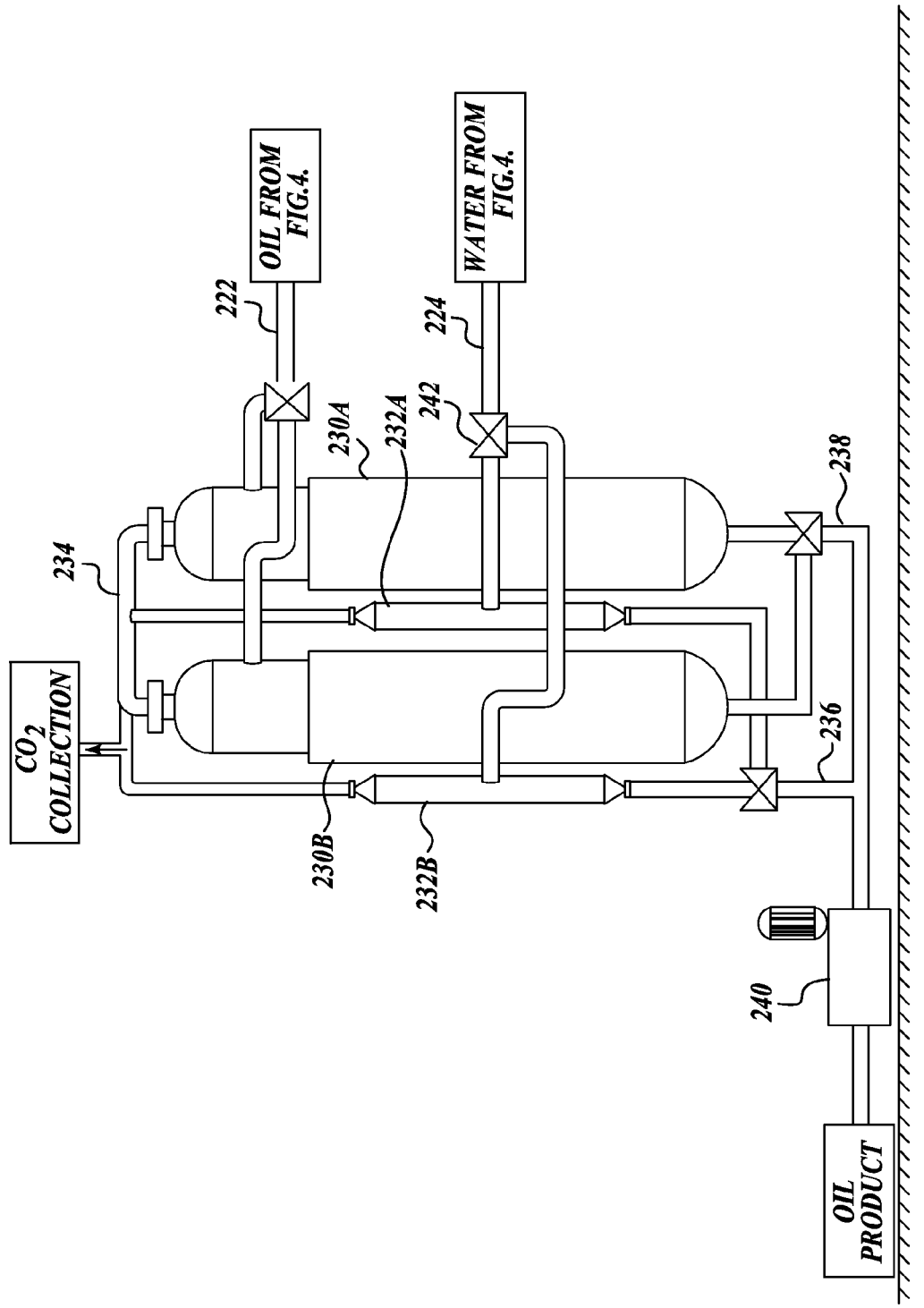
FIG. 6 is a schematic illustration of a process for the separation of lean from boneless beef containing lean and tallow, including equipment for the storage of tallow.

Referring to FIG. 6, the oil separated from disk centrifuge 172 in FIG. 4 is transferred via conduit 222. As seen in FIG. 6, the conduit 222 leads to one of two vessels 230a and 230b. The oil from conduit 222 may enter either one of two oil storage vessels 230a or 230b. Storage vessels 230a and 230b may sit on load cells. Load cells can be used to determine when the vessels 230a and 230b are filled to capacity. The water separated from the disk centrifuge 172 (FIG. 4) is transferred via conduit 224. Conduit 224 leads to one of two vessels 232a and 232b. Vessels 232a and 232b may sit on load cells that are used to determine when the vessels 232a and 232b are filled to capacity. When the load cells detect that the vessels are at capacity, a valve 242 may switch automatically to stop filling the vessel that is at capacity and start filling the empty vessel.

Oil storage vessels 230a and 232b may each have a capacity of approximately 200 gallons, while water storage vessels 232a and 232b may have a capacity of about 15 gallons each. The tops of the vessels 232a, 232b, 230a, and 230b may all be connected at the top end thereof to a common manifold 234. Manifold 234 may lead to carbon dioxide collection.

Vessels 230a and 230b each have an outlet at the bottom end thereof that is combined into a conduit 238. Vessels 232a and 230b have a common outlet 236.

The oil being separated by the disk centrifuge 174 may have little to no water. Accordingly, water that has been initially separated from the fat cells in the emulsification and rendering section may be returned at a rate to achieve an approximately 15% by weight water content in oil for a final composition of approximately 85% by weight oil, and 15% by weight water. If water is added to the oil, the combination may be treated by a homogenizer 240 to introduce the water back into the oil. The homogenized oil/water may be used as an ingredient in many products.

Figure 7:
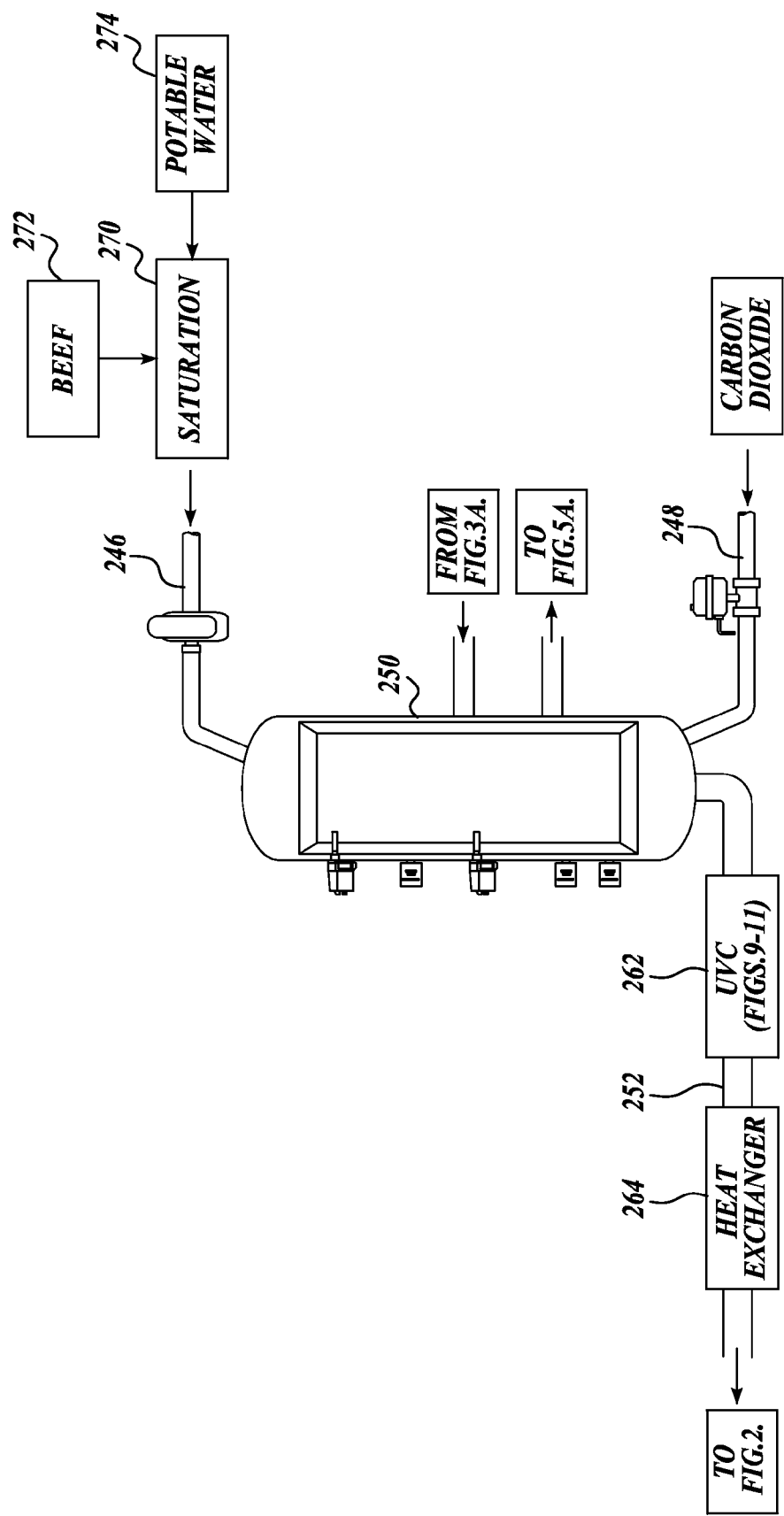
FIG. 7 is a schematic illustration of a process for the separation of lean from boneless beef containing lean and tallow, including equipment for the production of carbonic acid fluid, UVc treatment, and temperature-reducing of the fluid.

Referring to FIG. 7, a fluid storage vessel and carbonic acid generator is illustrated. Carbonic acid is one representative acid that may be used in the buoyancy separation process described above. Additionally, or alternatively, alkaline compounds may be used with an aqueous medium. Additionally or alternatively, acids, including carbonic acid, may be used. Carbonic acid is produced by combining carbon dioxide with water. In one embodiment potable water is introduced via conduit 246 into vessel 250. The level of water in vessel 250 may be controlled by metering the level, and/or the amount of water that is delivered to the vessel 250. Carbon dioxide gas is supplied via conduit 248, and is likewise metered into the vessel 250. Specifically, the carbon dioxide gas may be injected via a bubble-generating device, such as a very fine mesh or material having a highly porous surface. This produces very fine carbon dioxide gas bubbles that create a large surface area of gas for dissolving into the water. The pH of the carbonic acid is less than neutral. In one embodiment, the pH is less than 4. The pH may be monitored, and more or less water may be added to the vessel 250. Additionally or alternatively, more or less carbon dioxide may be metered into the vessel 250. In addition to clean, potable water, the vessel 250 also receives the fluid separated from the centrifuge 260 of FIG. 3a.

In one embodiment, a saturated fluid is produced by combining the clean potable water, block 274, with beef, block 272. The combining of potable water can take place in a chilled vessel, for example. The beef may be diced finely to more easily allow the absorption of compounds found in beef by the water. Compounds that may be absorbed by the water may include micronutrients, including vitamins, minerals, organic acids, organic and inorganic salts, and supplements. In some embodiments, the amount of micronutrients that are transferred from the beef to the water may result in approximately the same micronutrients, and at approximately the same amounts found naturally in the beef, such that the water may resemble "serum," or a close approximation to the naturally-occurring fluids in beef. In one embodiment, the fluid is combined with the beef, and allowed to mix with the beef until the fluid is saturated and comprises fluid that is virtually identical to the typical, or naturally-occurring fluids present on the surface of freshly cut beef.

In other embodiments, less than all the micronutrients found naturally in beef may be transferred to the water. In this case, it is possible to introduce the "missing" micronutrients from an artificial source to supplement what can be transferred through contact with beef alone. Isolated micronutrients, or those that can be bought in a purified form are readily available.

In other embodiments, substantially all the micronutrients found naturally in beef may be transferred to the water. However, the concentration of the micronutrients in the water is not equal to the concentration found in beef. Accordingly, the compounds in the water may be supplemented with micronutrients from another source.

Alternatively, in one embodiment, contact with beef may be omitted altogether, and instead, the potable water is combined with micronutrients available in isolated forms through other sources.

In still other embodiments, the water may be saturated with compounds other than micronutrients. For example, the water may be saturated with salts, such as sodium chloride, to produce a saline solution to use as the fluid.

Saturated as used herein means partially or fully saturated.

A purpose for using a micronutrient-saturated, or an otherwise saturated fluid in the process of separating fat particles from lean particles through buoyancy is to avoid the depletion of the natural micronutrients found in the lean. It is believed that if the fluid is saturated with fluids found naturally in beef, the micronutrients may remain in the lean and not be absorbed by the fluid. It should be realized that the contact of the fluid, such as water, occurring in block 270, is for the purpose of saturating the fluid with micronutrients, while the purpose of contacting the fluid in the combining tube 112, and the separator 140, is for seeking to separate the fat particles from the lean particles, and depletion of micronutrients from the lean particles is to be avoided in both the combining tube 112, and the separator 140.

In some embodiments, when potable water has been allowed to combine with beef in block 270, it is possible that the introduction of carbon dioxide is omitted. However, in other embodiments, a potable water saturated through contact with beef in block 270 can also be treated with carbon dioxide.

The saturated fluid is transferred out through conduit 252, which is first decontaminated by the UVc device 262, a description of which is provided in connection with FIGS. 9-11. The decontaminated saturated fluid is then temperature controlled by passing through the scraped surface heat exchanger 264. After the heat exchanger 264, the fluid is then delivered to any equipment as needed, such as the combining tube 112 (FIG. 2) and/or prior to the separation vessel 140 through conduit 125 (FIG. 2).

Figure 5:
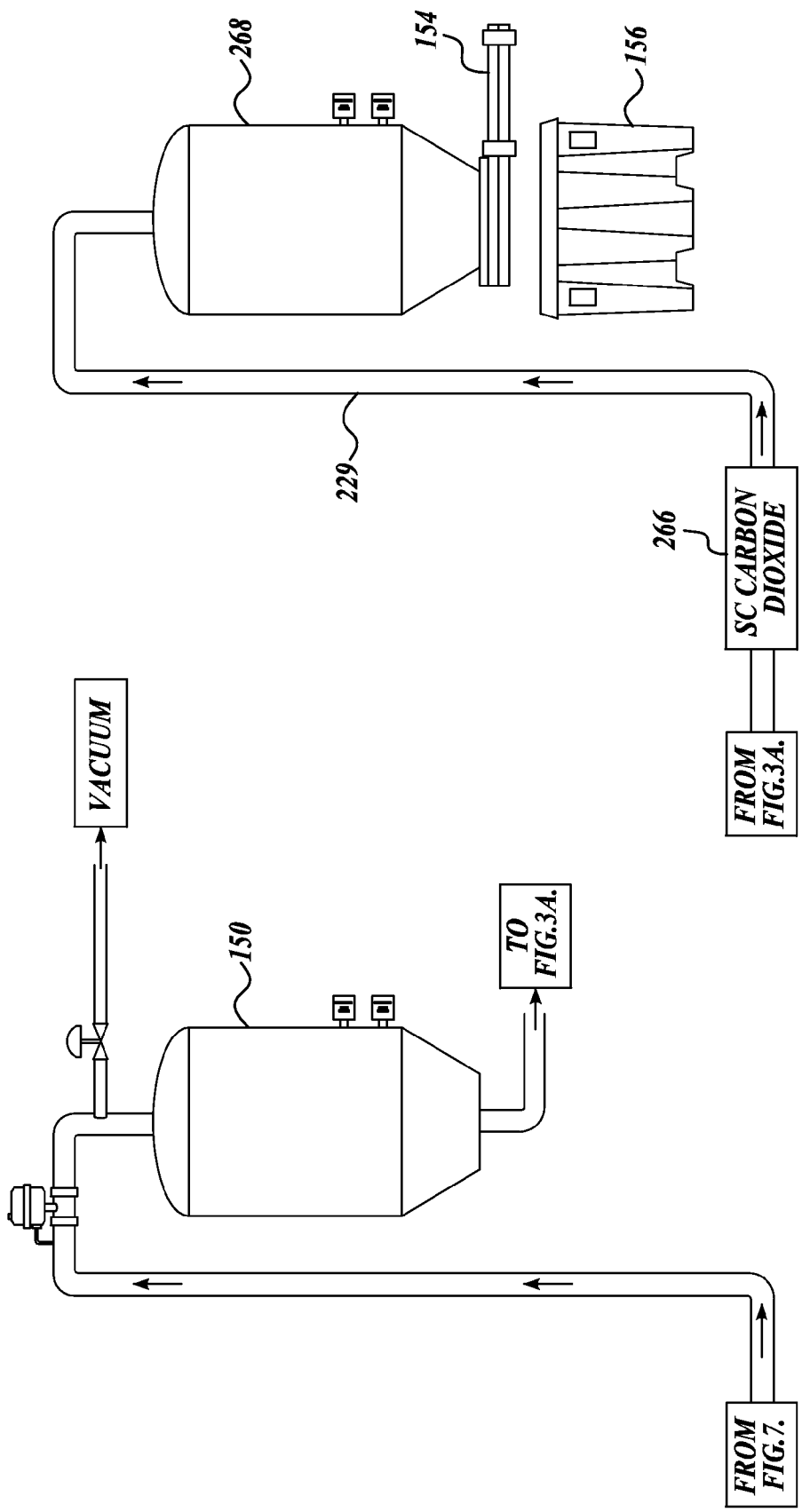
FIG. 5A is a schematic illustration of a process for the separation of lean from boneless beef containing lean and tallow, including equipment for dehydrating of fluid.
FIG. 5B is a schematic illustration of a process for the separation of lean from boneless beef containing lean and tallow, including equipment for the treatment of lean with supercritical carbon dioxide, and storage of diced beef.

In addition to providing fluid to the combining tube 112 and separation vessel 140, fluid is also provided to the lean in the lean vessels 144a, b. The fluid to the lean vessels 144a,b is transferred from vessel 250 to a dehydration vessel 150 (FIG. 5a). A vacuum is applied to the vessel 150 to remove water and/or carbon dioxide from the fluid. After the vessel 150, the fluid is combined with the lean, either in the vessels 144a,b, or in a conduit before, or after the vessels 144a,b.

Referring to FIG. 5B, the finishing step for a lean product is illustrated. As discussed above, lean is stored in lean reservoir vessels 144a and 144b (FIG. 3A). The outlet from the lean reservoir vessels 144a and 144b is pumped via pump 146 through conduit 228. Dehydrated fluid is combined with the lean and the mixture is sent for treatment with supercritical carbon dioxide in equipment designated 266 for the reduction of pathogens. After supercritical carbon dioxide treatment, the treated lean is transferred in conduit 228 that leads to the vessel 268. Vessel 268 may be operated under vacuum. The lean drops into the vessel 268. Vessel 268 may sit on load cells, which are capable of determining when the vessel 268 is filled to capacity. The vessel 268 is provided with a knife valve 154 at a bottom end thereof. When filled to capacity, the vessel 268 may be emptied onto totes 156 and carried away on trucks or by rail to predetermined destinations. The vessel 268 may be connected to a vacuum source, so that any remaining carbon dioxide and/or water that may flash vaporize. Treating the lean particles under reduced pressure, such as vacuum, adjusts water content and lowers the temperature of the beef product to produce a controlled water content beef product.

The final product may contain 8% to 10% by weight fat. However, the fat content may be continuously measured and adjusted as necessary, for example, the density of the separating fluid may be varied so as to change the separation point between the fat particles and the lean particles. Additionally, or alternatively, a controlled and measured quantity of fat particles that are collected in the vessels 148*a,b* may be combined with the lean product of vessels 144*a,b*.

Figure 8:
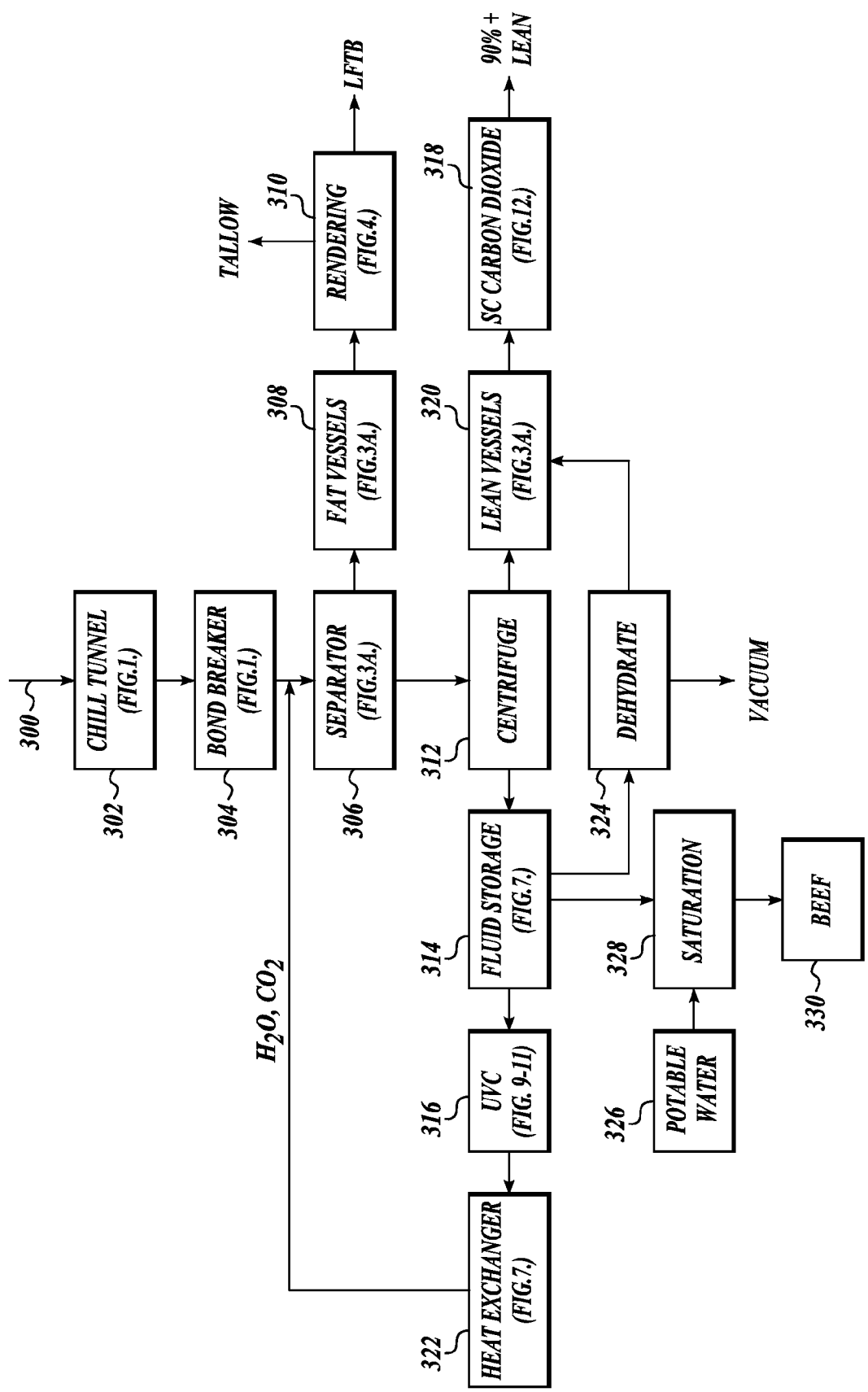
FIG. 8 is a block diagram of a process for the separation of lean from boneless beef containing lean and tallow.

Referring to FIG. 8, a method for separating fat from lean while minimizing the loss of micronutrients from the lean is illustrated.

The method begins by introducing pieces of beef 300 into a chilling tunnel, block 302. The apparatus for performing this step is illustrated in FIG. 1. However, other apparatus are suitable. As described in association with FIG. 1, the purpose of the chilling tunnel is for reducing the temperature of the beef pieces to a temperature at which the fat can be broken off from the lean while the lean remains essentially pliable and does not break into smaller particles. From block 302, block 304 is entered.

In block 304, the beef pieces are processed by an apparatus that is capable of breaking the bonds between fat and the lean matter. One embodiment of an apparatus for performing this "bond-breaking" process is illustrated in FIG. 1. However, other apparatus are suitable. As described in association with FIG. 1, the bond-breaking apparatus can include two sets of parallel spaced-apart rollers with or without intermeshing teeth and through which the beef pieces are dropped therebetween after being temperature-reduced in the chilling tunnel. From block 304, block 306 is entered.

Block 306 is for separating the fat particles from the lean particles. One embodiment of an apparatus capable of achieving such separation is described in association with FIG. 3A. However, other apparatus are suitable. Before, during, or after entering the separator, a fluid is combined with the fat particles and the lean particles to cause separation based on the respective buoyancy of particles that comprise a majority of fat versus the particles that comprise a majority of lean. As described herein, the fluid can be a saturated fluid. For example, the fluid can be an aqueous fluid saturated with liquids from beef before the fluid is used to separate the fat and lean particles. A purpose for saturating the fluid is to prevent or reduce the depletion of micronutrients from the lean particles that are about to be separated. By saturating the fluid by exposure to beef prior to combining with the lean particles, the fluid does not substantially absorb micronutrients from the lean particles. Further as described herein, the contact of beef with the fluid can be performed by a variety of methods.

From block 306, the separated fat particles are transferred to the fat vessels, block 308. The fat vessels for weighing the fat are described in association with FIG. 3A.

From block 308, block 310 is entered. Block 310 is for rendering the fat particles into tallow, and light, finely textured beef. Apparatus suitable for rendering the fat particles into both tallow and light, finely textured beef is described in association with FIG. 4. However, other apparatus is suitable.

From block 306, block 312 is also entered. In block 312, a mixture of lean particles and fluid is separated from each other, such as via a centrifuge. From block 312, block 320 is entered.

Block 320 is for weighing the lean particles in vessels. Apparatus for weighing the lean particles is described in association with FIG. 3A. From block 320, block 318 is entered.

Block 318 is for treating the lean particles to reduce pathogens. In one embodiment, the lean particles can be treated with carbon dioxide at supercritical conditions, i.e., above the critical temperature and pressure of carbon dioxide. The separation method disclosed herein can achieve the production of diced beef having a content of approximately 90% or more by weight of lean. Additionally, the disclose method can be used to product tallow and light, finely textured beef (LFTB) from fat.

Returning to block 312, the separated fluid is sent to fluid storage, block 314. Apparatus that may be used for fluid storage is described in association with FIG. 7. As shown in FIG. 8, clean potable water, block 326 can be contacted with beef, block 330, to cause saturation, block 328, of liquids and compounds from the beef in the clean potable water, i.e., the fluid. From block 314, block 316 is entered.

Block 316 is for treating the fluid with, for example, ultraviolet C radiation to reduce pathogens. The apparatus described in association with FIGS. 9-11 can be suitable for performing block 316. However, other apparatus are available. From block 316, block 322 is entered.

Block 322 is for temperature-reducing the fluid. From block 322, the fluid is combined with the fat and the lean particles coming from the bond-breaking block 304.

Returning to block 314, a portion of fluid is diverted for dehydration, block 324. Apparatus for performing dehydration, block 324, is described in association with FIG. 5A. However, other apparatus is also suitable. The dehydrated fluid can then be combined with the lean particles in the lean vessels, block 320.

Referring to FIGS. 9, 10, and 11, embodiments of a UVc device (block 262) for decontaminating the fluid from vessel 250 of FIG. 7 are illustrated.

In the embodiment of FIGS. 9 and 10, the UVc devices include a central tube 12. The tube 12 is transparent to certain wavelength energy, such as ultraviolet and, particularly, to ultraviolet C. However, other wavelength energy can be used as long as such different wavelength energy can penetrate the tube without affecting the anti-bacteria, bactericidal effectiveness of the penetrating energy or alternatively, the effectiveness or capacity of the energy penetrated tube to remain capable of retaining the pressurized liquid retained by the tube and through which it is transferred. For example, it is known that ultraviolet light, including UVc, can render extruded, transparent uPVC tubing having gas barrier and high pressure rating conduit qualities, to become a translucent yellow coloration with brittle or friable consistency, which then, therefore, renders it useless for high pressure liquid retention. Alternative forms of energy can include electron beam, irradiation, microwave, X-ray, infrared, or the like. Ultraviolet C radiation is generally considered to be light energy having a wavelength from 200 to 290 nanometers. In one embodiment of the tube 12, the tube 12 is also transparent to visible light. Further, in one embodiment, the tube 12 can be made from polycarbonate or other such materials that can withstand a pressure of about 10 psig to about 3,000 psig, which is the pressure range at which carbon dioxide is a liquid from about (minus 60° F.)-60° F. to about (plus 87.9° F.)+87.9° F.

The tube 12 can be connected at a proximal and distal end of a stainless steel tube 16. The tube 12 is held to the end of the stainless steel tube 16 via clamp 32 on one side and via clamp 36 on the opposite and distal side. In FIG. 9, the proximal side is considered the side on which clamp 32 is located. The distal side is considered the side on which clamp 36 is located. Arrow 17 is intended to indicate the direction of flow of material through the tube 12, whereas arrow 11 shows the direction of material exiting from the tube 12. Although FIG. 9 illustrates the apparatus as being vertically disposed, the device does not need to be placed in the vertical position and may be placed in any other position relative to the ground. The device includes one or more energy emitting elements, such as energy emitting elements 14 and 26. The energy emitting elements 14 and 26 are generally disposed parallel to the tube 12 and also extend generally the same length as the tube 12 or extend beyond and overlap the ends of the clear section of the transparent conduit 12, that is, the one or more energy emitting elements 14 and 26 extend from the proximal side of the tube 12 to the distal side of the tube 12. A space or gap may be provided between the side of the energy emitting elements 14 and 26 and the side of the tube 12, although this is not a requirement.

As seen in FIG. 10, in one embodiment, more than one energy emitting element may be provided. Generally, the tube 12 may be centrally located and enclosed within an arrangement, whereby energy emitting tubes, such as 14 and 26, are located in an array or circular arrangement around the central tube 12 and disposed at an equal distance from the tube 12, so that the energy emitting elements may project entirely around the circumference of the tube 12. The energy emitting elements may be evenly spaced around the circumference of the tube 12. However, a single energy emitting element may be manufactured as a unitary cylinder that also extends approximately the whole length of the tube 12. In the case where multiple energy emitting elements are used, each energy emitting element may take the form of a tube. In this case, each individual tube is paired with a reflector, such as parabolic reflector 31. Reflector 31 extends the length of the energy emitting element with which it is paired. Reflector 31 is concave or paraboloid (parabolic) to focus or direct reflected energy to the tube 12. Reflector 31 is positioned so as to reflect all energy beams or rays inward toward the center of the tube 12 and thereby concentrate and/or direct the energy produced by the energy emitting element towards the center of tube 12, which, in the illustrated embodiment, is disposed at the center of the assembly. A suitable frame, such as 15, may be used to hold the individual energy emitting elements in the desired spatial relationship with respect to the central tube 12 and with respect to each other. Additionally, an exterior frame 15 may be used to hold each individual reflector 31 that is paired with each individual energy emitting element in the desired spatial relationship with respect to the energy emitting element and to the central tube 12. For example, as seen in FIG. 9, each individual energy emitting element, such as 26, is held within the frame 15 with an upper and a lower bracket, such as brackets 35 and 34, respectively. Each reflector that is paired with an energy emitting element is attached to the inside of the frame 15. However, any other suitable frame made to hold energy emitting elements and reflectors may be used.

In another embodiment of a UVc device, the cross section of which is seen in FIG. 11, the open frame 21 may be replaced with a stainless steel tube 50 having an interior diameter sized to accommodate central tube 53, and further sized to accommodate 1 (one) inch diameter fused quartz tubes 51 on the inner surface 52 of the stainless steel tube 50. Each of the fused quartz tubes 51 hold a UVc light in the interior thereof. The UVc lights (also tubes) are enclosed in fused quartz tubes with an air space between the light tube and the fused quartz tube. The air space insulates the light tube from the direct chilling effects of the chilled suspension fluid passing in the annular space between the central tube 53 and the outer tube 50. While air is used in one embodiment, the space between the UVc light and the interior of the fused quartz tube may also include other gases, either essentially pure, or as a mixture, such as nitrogen, carbon dioxide, hydrochlorofluorocarbons (HCFCs), hydrofluorocarbons (HFCs), and the like. The UVc lights may use low pressure mercury vapor to generate the UVc radiation. In particular, a wavelength in the 240 to 280 nanometer range can be used. In one embodiment, the wavelength for disinfection can be about 260 nm.

The central tube 53 can be made from materials similar to tube 50. A plurality of fused quartz tubes 60 (with UVc lights) are placed on the exterior of the central tube 53, such that an annulus space is created between tubes 53 and 50. Deflectors may be arranged in and around the annular space and UVc tubes to cause rotation of the beef particles so as to cause exposure of all surfaces of the beef particles to the UVc radiation, and deflect the solids (beef particles) to inhibit contact with the quartz tubes so as to prevent smearing of fat onto the warm fused quartz tubes or cause other damage and/or breakage. For example, deflectors, such as thin fins can be placed in a spiral configuration on the inside of the surface of the tube 50 and before the fused quartz tubes 51. The inner surface 52 of the stainless steel tube 50 is polished to reflect energy toward the central tube 53. Thus, eliminating the reflectors 31 shown in FIG. 9. In one embodiment, the inner surface 52 of the stainless steel tube may hold up to fifty fused quartz tubes with UVc lights inside. In one embodiment, thirty fused quartz tubes 51 may be placed around the circumference of the inner surface of the stainless steel tube 50 and twenty of the fused quartz tubes 51 may be placed around the circumference of the outer surface of the central tube 53. However, the number of UVc tubes may be varied based on outer tube 50 or central tube 53 diameter. In other embodiments, UVc devices may use fewer or more UVc tubes. The beef particles may pass in the annulus created between the tubes 50 and 53. The beef particles and fluid, which may include water, comprise a suspension and the temperature of the fluid is controlled, such as by chilling, to prolong the presence of frozen water retained in the beef so as to minimize loss of blood, plasma, and micro-nutrients. The suspension comprises the fluid 148 and the beef particles, having been processed through the dice, chill, and bond breaking steps 142, 144, and 146. The amount of fluid is sufficient to allow the beef particles, including fat and lean, to be suspended in the fluid. The amount of fluid that suspends the beef particles allows rotation of the beef particles in the fluid so as to cause exposure of all surfaces of the beef particles to the UVc radiation. The UVc tubes 51 and 60 on the respective tube surfaces allow the beef particles to be irradiated with UVc energy from two opposing directions as the beef particles pass within the annulus. The fluid may need to be filtered after use if it is to be recycled so as to remove all suspended solids including dead microorganisms.

The heating effect of UVc light sources can be significant. For example, a single device (enclosed tube) can use 23×>60 inch UV lights at up to about 190 watts per light, which represents 3.6 kW of electrical power consumed per device. With three devices arranged in series, the electrical power consumed during operation can be 11.0 kW for 3× "tubes."

The projected area of a light source, assuming a single >60-inch long, 190 Watts UV light located within a one-inch diameter fused quartz tube, is approximately 60 inches×1 inch (about 60.0 sq. inches). Then, twenty three (23) such lights arranged in two concentric, circular formations, wherein the inner arrangement comprises seven (7)>60-inch UV lights each being enclosed within a one-inch diameter fused quartz tube may have a total projected area (one side) of 420 in$^2$, and the outer arrangement comprises sixteen 60-inch UV lights each being enclosed within a one-inch diameter fused quartz tube may have a total projected area (one side) of 960 in$^2$. This represents the maximum density (11.0 kW per 1,380 in$^2$=7.97 Watts/in$^2$) when all lights are enclosed (and sealed fluid tight) in individual fused quartz tubes.

If the UVc light bulbs are not enclosed in fused quartz tubes and the UV light bulb has a diameter of about 0.625 inches, but the cooling effect of the fluid would inhibit generation of UVc.

No molds, viruses, bacteria or micro-organisms are thought to survive when exposed to sufficient UVc light and the UVc device should be constructed to facilitate the delivery of 40 mJ/cm$^2$.

In one embodiment, the space between the fused quartz tubes 51 and the central tube 53 can be immersed with nitrogen gas transferred in and out via an inlet and outlet. The nitrogen or other cooling media can be used in sufficient volume to cool and maintain a suitable temperature.

In the embodiment of FIG. 9, ultraviolet C radiation passes through the walls of the central tube 12 where it can strike the fluid within the inside of the tube 12. The velocity of the fluid can be increased to induce turbulence, so that any solid matter may be caused to rotate to expose all surfaces of solid matter to the UVc energy.

One embodiment of the central tube 12 as shown in FIGS. 9 and 10 is of round cross-sectional profile, and a round profile is convenient since tube extruding dies are typically built so as to produce round tubing, however, any suitable profile can be incorporated and most preferably any profile that can most effectively expose the outer surfaces of all fat and lean particles to the UVc light. The lethal or bactericidal effectiveness of the UVc light is enhanced when the distance between the UVc light source and the external surfaces of each particle, carried by the fluid, is minimized, and this can be achieved by reducing the depth of the transparent tube 12 or thickness across the tube.

The electrophoresis effects of short wavelength light (UVc) causes damage to the DNA of bacteria, thereby rendering the bacteria non-viable. An effective bactericidal UVc light wavelength has been demonstrated to be in the range of 187 nanometers, however, the conditions required to enable this UV wavelength to contact the bacteria carried on the food surfaces are challenging in a food mass production apparatus.

The space between the UVc light and the interior of the fused quartz tubes 51 and 60 may comprise a vacuum or dry nitrogen gas filled space. In one embodiment, UVc of about 285 nanometers wavelength is suitable. Water cannot be in direct contact with the UVc light's glass, for example, low pressure, high temperature mercury vapor lamps, nor indeed can the organic matter itself be in contact with the UVc light given the high temperature conditions required to generate UVc light. It is therefore useful to provide materials that are transparent to the selected UVc light wavelength, between the UVc light source and the treated matter. Materials that have been used to provide UV light transparent barriers include certain gases such as nitrogen, water, PMMA (Poly-Methyl-Meth-Acrylate), or acrylic and fused quartz glass; however, these materials generally limit the use of UV light to wavelengths at about 285 nm. A most suitable material is synthetic UV grade quartz glass or UV grade fused silica, which allows 80% penetration of UVc 185 nm wavelength.

Quartz glass tubes 51 and 60 can be manufactured from fused silica having a thickness of about 10 mm so as to allow UVc of wavelength 160 nm to pass through and contact the surfaces of beef particles being carried past the quartz tubes 51 and 60. It should be noted that the temperature of the fluid can be maintained at about 40 degrees F. or less, such that a film of ice can form over any particles or, alternatively, the temperature of the fluid can cause thawing only at the surface of any particles. In this way, UV light of wave length 160 nm or in another instance 285 nm generated by UV lights can penetrate the fused silica walls of tubes. In one embodiment, multiple UV sources are arranged in close proximity to the outer surface of any conduit carrying lean and fat particles, wherein alternate UV sources are provided. For example, a UV source is firstly a UV generating source of about 160 nm wavelength and the alternate UV source is a UV generating source of about 285 nm wavelength. Furthermore, devices of different wavelength energy can be used within a single UVc device.

Figure 12:
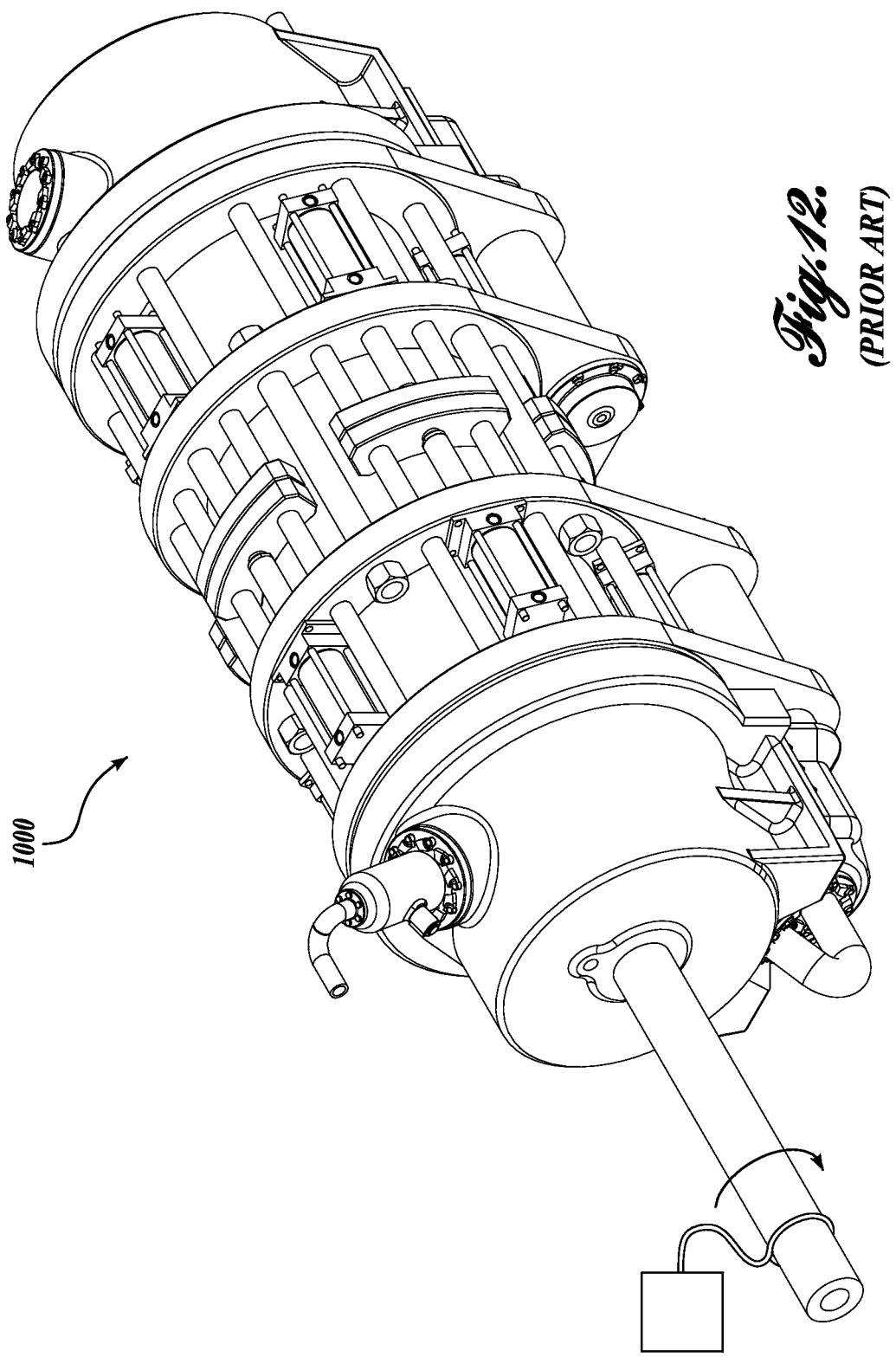
FIG. 12 is a diagrammatical illustration of equipment to treat beef products with supercritical carbon dioxide.
Figure 13:
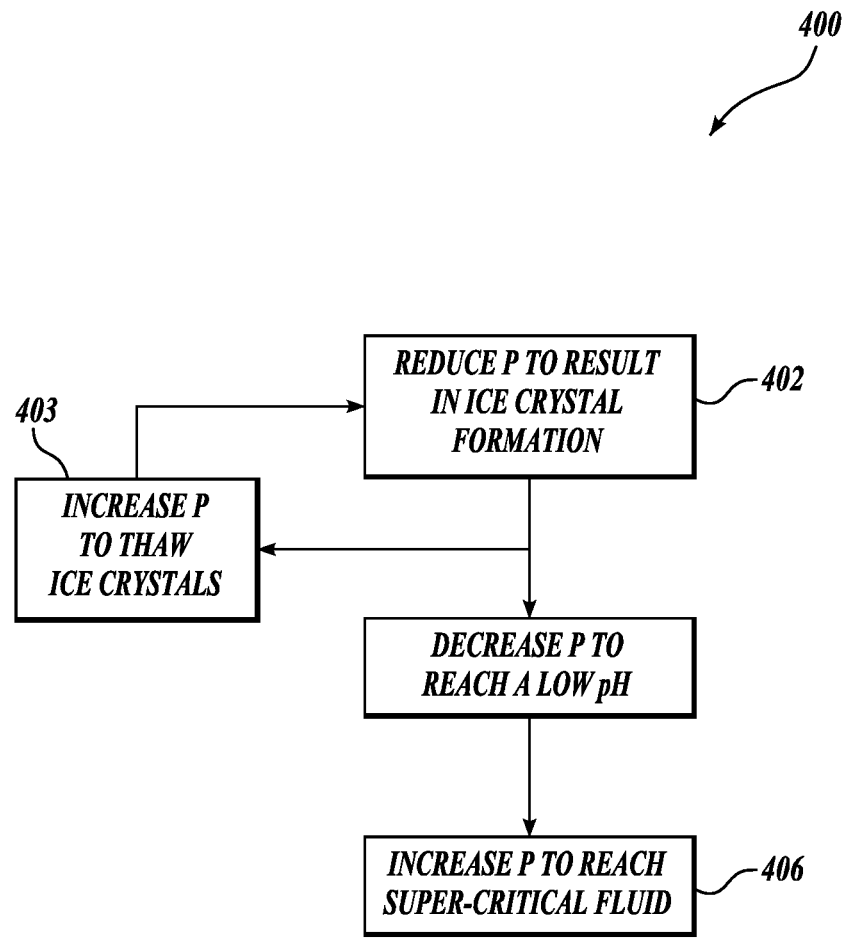
FIG. 13 is a diagrammatical illustration of a block flow diagram of a method for treating beef products with supercritical carbon dioxide.

Referring now to FIGS. 12, and 13, an apparatus 1000 and method 400 for decontaminating lean with supercritical carbon dioxide are illustrated. The apparatus 1000 is used for separately treating the beef from fat for pathogen deactivation.

Boneless beef, as provided after a carcass has been processed to remove the primals, when infected with Pathogens, such as $E.\ Coli$ 0157:H7, may generally comprise a fat component that will likely include a predominant proportion of the total pathogen population while the lean component will likely comprise a lower pathogen population. This occurs because pathogen contamination generally occurs due to contact with any vector of pathogen contamination by the outer surface making contact therewith. The outer surface of a beef carcass is generally substantially covered with a fat layer hence the fat component of boneless beef and trim will often comprise the major proportion of any pathogen contamination contained with a given quantity of boneless beef. Separating the fat component from the lean component can, therefore, provide a means of dividing the pathogen population with a greater proportion carried with the fat component and less with the lean component. The fat component includes protein of significant value, even after separation from the lean component and fat with proteins can be heated to higher temperatures compared to lean, such as above a pasteurization temperature of 160° F. and higher. However, the lean component cannot be heated without causing unacceptable changes in color and composition. Therefore, the proteins contained in the fat component can be separated and then recombined with the lean component without affecting the finished high lean content product. Furthermore, when 30's (XF's) or 50's boneless beef are separated into two streams of: 1) a fat and beef proteins (including chemical lean) component; plus, 2) beef of approximately 90% or 93% lean content (visual lean), an opportunity to subject each stream to different pathogen deactivation treatments is available. Most preferably, the fat stream (with proteins) can be pasteurized by elevating the temperature of the stream to above a pasteurization temperature of greater than 160° F. while the heat sensitive lean stream can be most preferably treated to reduce pathogen populations in supercritical carbon dioxide and according to the method described in the applicant's U.S. Pat. No. 8,101,220, to undetectable levels while the predominantly fat stream (and any proteins) can be pasteurized thermally by increasing its temperature to greater than 160° F. or greater than 190° F. Accordingly, after separation of the lean component from the fat component, followed by separation of the lean stream from the fluid with which it (and the fat stream) was combined prior to separation of fat from lean, the lean component can be immersed in supercritical carbon dioxide according to a treatment described in the referenced '220 patent. Applicant's U.S. Pat. No. 8,101,220, entitled TREATMENT TO REDUCE MICROORGANISMS WITH CARBON DIOXIDE BY MULTIPLE PRESSURE OSCILLATIONS, which is hereby incorporated with this patent application for all purposes, can effectively reduce pathogen populations to undetectable levels without affecting the appearance of the lean component. Separately, the fat stream, which can contain substantial quantities of proteins, can be homogenized and then pasteurized by heating to an elevated temperature of greater than 190° F. or at least above 160° F. or higher such as 200° F. or more, which may render all pathogens inactive. The heat pasteurized stream of fat and proteins is then centrifuged to separate the liquid fat (tallow) from the proteins and any remaining water. The proteins and water can then be recombined with the lean stream without any deleterious effect on appearance of the fresh beef.

The apparatus 1000 and method 400 are described in applicant's U.S. Pat. No. 8,101,220. For brevity, the apparatus 1000 will not be described, as it is fully disclosed in the '220 patent, and reference may be easily made. In general, any device that is capable of achieving the critical temperature and pressure of carbon dioxide is suitable. The illustrated device is capable of achieving such carbon dioxide critical temperature and pressure via the use of hydraulically-activated pistons that compresses a space filled with carbon dioxide fluid and the lean. It should be noted that the apparatus 1000 may use a substantially incompressible fluid, such as potable water that should not render the lean inedible should a hydraulic fluid leak occur.

The apparatus 1000 can be used to destroy or render harmless viruses such as hepatitis, malaria, tuberculosis, the SARS virus, and also the extraction of prions that may have become mixed with the lean. Such prions may be the cause of BSE (bovine spongiform encephalopathy). It is well known that in order to destroy BSE prions, they must be heated to a very high temperature and to such an extent that the molecule may change form by decomposition or reaction with other elements or compounds. However, such temperatures cannot be applied to food, such as boneless beef, and therefore, the preferred means of dealing with such a food safety matter can occur by removal from the food stream. In the event that such prions are known to be present with any food, the food product must be removed from the food chain and dealt with as required according to USDA regulations. However, the apparatus 1000 may provide a useful precautionary means of washing boneless beef portions with supercritical carbon dioxide (carbon dioxide above the critical temperature and pressure) and then separating the lean from fluidized extracts collected in a stream of carbon dioxide fluid.

Referring to FIG. 13, a method for treating lean with fluid carbon dioxide, including supercritical carbon dioxide, is illustrated. A method in accordance with one embodiment includes introducing boneless beef, carbon dioxide, and optionally water, under pressure in the range of 200 psig to 500 psig or, alternatively, thereafter, raising the pressure of carbon dioxide within the apparatus illustrated in FIG. 12 such that when the pressure is reduced, the water that is on the surface of the goods may freeze, block 102. However, the reduction in pressure is controlled so that there is insubstantial freezing of the water below the surface.

In accordance with this embodiment, when the water freezes on the surface of the boneless beef, wherein microorganisms may reside, needle-like ice formations of microscopic size, form in a random pattern. As the freezing process of water continues, the needle-like ice formations become part of the solid ice that can form when all water present is frozen solid. The needle-like ice crystal formations perforate the microorganisms' cell walls and membranes. When the ice crystals thaw and defreeze, the perforations are left behind allowing low pH dense carbon dioxide or supercritical carbon dioxide to enter the microorganisms through the perforations. A pH differential of at least about 1 or less can detrimentally affect or damage the microorganisms, so too can the supercritical carbon dioxide solvent when it enters the microorganisms. Furthermore, pH fluctuations of at least about 1 between the inside of cells and the outside of cells can cause further damage. To cause the needle-like ice crystal formations, liquid or dense carbon dioxide is in contact with the surfaces of the beef in sufficient quantities to cause freezing of the free water that is in contact with the microorganisms. To this end, free water may be added to ensure that all the surfaces of the beef that potentially could have been contaminated have a thin layer of water that surrounds and is in contact with the microorganisms. Such water later freezing and causing damage to the microorganisms. It is intended that a feature of the apparatus now being described, is the capability to cause the partial freezing of water by rapidly elevating and reducing the pressure of the water and carbon dioxide with the boneless lean. More particularly, a reciprocating action of pistons in the apparatus 1000 can be arranged to cause partial freezing of water provided therein, which is in direct contact with the surface of the boneless beef. Such reciprocating piston movement can also cause the flexing of the contents and when bacteria cells are exposed to this physical action, the needle-like ice crystals can affect the bacteria cells in a detrimental manner, such as by puncturing the cell walls. The rapid formation of needle-like ice crystals corresponding with a pressure reduction, followed by the rapid elimination thereof corresponding with an increase in pressure and temperature, can provide an environment lethal to single cell pathogens. The lethality of the environment is created due to several mechanisms that relate directly to the temperature and pressure of the carbon dioxide. For example, when the pressure of carbon dioxide is lowered to, for example, 300 psig, from an existing pressure of 1000 psig at 50 degrees F., the temperature of the lower pressure carbon dioxide may fall below the freezing point of water, therefore, causing ice crystals to form, block 402. When a mixture of the appropriate proportions of liquid phase carbon dioxide with liquid phase water and boneless beef, all held at a pressure of 1000 psig and temperature of 40 to 50 degrees F., and the pressure is reduced to, for example, from 300 to 400 psig, the temperature of the carbon dioxide may drop to below 20 degrees F., and when sufficient carbon dioxide is present with the liquid phase water, ice crystals may form. Ice crystals formed in this manner can have needle-like characteristics easily capable of rupturing the cell wall of a pathogen, such as *E. coli* 0157:H7. Before substantial freezing of the food below the surface can occur, the pressure is rapidly elevated to raise the temperature, block 403. The cycle can be repeated as many times as is desired. With the apparatus 1000, the pressure of carbon dioxide can be oscillated, wherein the upper and lower pressure limits are selected below the super critical phase of carbon dioxide. The lower pressure limits can be selected so as to ensure formation of ice crystals when the pressure is oscillated to a low pressure, and the upper pressure limits can be selected so that the ice crystals are substantially eliminated when the pressure is oscillated to a higher pressure. Such oscillation between low and high pressures can cause a corresponding oscillation of freezing and thawing temperatures. Any water mixed in or on the surface of the goods may freeze when the temperature at the lower selected pressure is sufficiently below the freezing point of water, and the water may thaw when the temperature at the higher pressure is sufficiently above the temperature at which water may freeze. When carbon dioxide and water are mixed together and are present at the surface of goods, such as meat (or fruits and vegetables), the ice crystals formed can, due to the needle-like morphology that ice crystals so formed can create, be lethal to bacteria by rupturing the cell walls thereof.

In another embodiment, the pressure and temperature conditions can be adjusted such that carbon dioxide, water, and boneless beef are retained under elevated pressure of, for example, up to, but less than approximately 1000 psig, such that the carbon dioxide and water react together to form carbonic acid having a pH in the range of about 2 to about 5, preferably about 3 to about 4. Alternatively, the pH can be less than 3, 4, or 5. The pH range can be about 2 to about 5, or any value in between. The hydrated carbon dioxide ($CO_2 \cdot H_2O$), or more correctly $H_2CO_3$ is a defined compound having dissociated ions represented by $[H^+]$ $[HCO_3^-]$ at 1000 psig. This condition results in a lowering of the pH that affects pathogens in a detrimental manner, and if sufficiently low can be lethal to pathogens and, in particular, when the pathogens have been previously detrimentally affected or injured, such as by the puncturing of the pathogen cell wall membrane, as discussed above. The needle-like ice crystals are capable of injuring pathogen cells by puncturing the cell walls, and when this condition is followed immediately by an elevated pressure of approximately 1000 psig, the resultant lower pH can more readily access the internal regions of the pathogen cell, thereby lowering the cell pH sufficient to cause death of the pathogen. The raising of the pressure to levels of about 1000 psig to cause a low pH can be affected by the apparatus 1000.

In yet another embodiment, a different set of temperature and pressure conditions can be achieved within the apparatus 1000 that affects the microorganisms in a detrimental manner, block 406. When carbon dioxide is pressurized above about 1100 psig and heated above about 88° F. (or 36° C.), i.e., the critical pressure and temperature of carbon dioxide, carbon dioxide is a supercritical fluid. Supercritical carbon dioxide is detrimental to bacteria, such as *E. coli* 0157:H7, when the bacteria are exposed to a sufficient quantity of the supercritical carbon dioxide. In this embodiment, a blend of carbon dioxide, water, and boneless beef are provided to the apparatus 1000. The pressure is elevated above 1056 psig at a temperature greater than 88 degrees F., i.e., greater than the supercritical pressure and temperature of carbon dioxide. At the supercritical conditions, the carbon dioxide possesses aggressive solvent properties capable of dissolving lipids. The cell walls of pathogens are constructed of a complex structure of lipids, and these cell wall lipids may dissolve when exposed to a powerful solvent, such as supercritical phase carbon dioxide. Supercritical pressure and temperature can be produced before or after any one of the other sets of conditions, discussed above, that detrimentally affect the microorganisms. Furthermore, all three sets of conditions can be sequenced in any order, as illustrated, and repeated any number of times, in the same, or a different sequence, or even one set of conditions may be repeated two or more times before changing to another set of conditions. In other embodiments, only the supercritical conditions need to be performed.

In summary, the apparatus 1000 can be used to provide one or more procedures, or any combination thereof, of varying pressure and temperature conditions of carbon dioxide that can destroy and deactivate microorganisms, and can be carried out in any order and repeated as many times as desired. Such procedures include: (1) oscillating between low and high pressure to cause ice crystal formation and thawing in rapid succession, (2) raising pressure to create a dense phase of carbon dioxide with a low pH, and (3) raising pressure to create supercritical carbon dioxide to affect the cell wall lipids of microorganisms.

The apparatus 1000 is capable of transferring boneless lean through a pressure vessel and oscillating the pressure between any lower pressure, such as about 300 psig, 350 psig, 400 psig, 450 psig, 500 psig, and so on, and up to an elevated pressure of about 1100 psig or greater, thereby causing multiple sets of circumstances to kill or reduce microorganisms, such as pathogens. Such lowering of pressure leads to temperature changes, such that at a lower pressure, ice crystals with needle-like characteristics may form, and conversely, upon raising the pressure of carbon dioxide, a low pH acid is created at an elevated pressure of, for example, about 1000 psig and finally, by increasing the pressure and temperature to supercritical levels above 1058 psig and above 87.8 degrees F., lipid dissolving solvent characteristics are achieved. The raising and lowering of pressure to achieve ice crystal formation, low pH, or lipid dissolving solvent characteristics via carbon dioxide can be practiced in any order and repeated as many time as is desired, or any set of conditions can be practiced singly, and as many times or for a period to destroy or reduce microorganism populations in lean.

The process is not limited to being performed in any particular sequence. For example, pathogen deactivation may occur after separation, or any time before then. Some steps may be omitted and substituted for one or more steps, or that perform the similar function, or are arranged in a different sequence to perform the similar function. Some steps may be omitted that are merely ancillary, or embraced as a subsystem of the process as a whole.

In one embodiment, a method for separating fat from lean while minimizing the loss of micronutrients from the lean, is disclosed. The method includes combining a mixture of fat particles that are a majority of fat, and lean particles that are a majority of lean, with a saturated aqueous fluid, wherein a density of the fluid is greater than a density of the fat particles, and wherein the fluid is saturated with one or more components found in beef prior to being mixed with the particles. The method includes collecting the fat particles separate from the lean particles by causing the fat particles to rise in the fluid, and collecting the lean particles.

The method may include, before combining with the fat particles and the lean particles, saturating the fluid by combining water with beef particles, and allowing the liquids present on the beef to mix with the water.

The method may include allowing the water to comprise components that are found in beef at approximately the same concentration.

The method may include a fluid that is saturated with a salt.

The method may include sodium chloride.

The method may include a fully saturated fluid.

The method may include a fluid saturated with micronutrients.

The method may include treating the saturated fluid by irradiation with UVc energy before combining with the particles.

The method may include collecting the lean particles and fluid, separating the fluid, dehydrating the separated fluid, and combining dehydrated fluid with the lean particles.

The method may include emulsifying the fat particles to produce solids, converting the fat particles into oil, pasteurizing the oil and solids together by the application of heat, and separating the solids from the oil.

The method may include a partially saturated fluid.

The method may include a fluid having one or more components naturally found in serum of fresh beef.

The method may include a fluid that resembles serum of fresh beef with respect to the type of components found in the serum.

The method may include a fluid that resembles serum of fresh beef with respect to the quantity of components found in the serum.

The method may include one, more than one, or all of the above features.

While illustrative embodiments have been illustrated and described, it will be appreciated that various changes can be made therein without departing from the spirit and scope of the invention.

The invention claimed is:

1. A method for separating fat from lean while minimizing the loss of micronutrients from the lean, comprising:
   creating a chilled aqueous saturated fluid with micronutrients by combining water with beef;
   after creating the aqueous saturated fluid, combining a mixture of fat particles that are a majority of fat, and lean particles that are a majority of lean, with the saturated aqueous fluid, wherein a density of the fluid is greater than a density of the fat particles, and wherein, prior to being mixed with the particles, the fluid is saturated with one or more micronutrients found in beef;
   performing separation of the fat particles and lean particles by contacting with the aqueous saturated fluid, and the aqueous saturated fluid reduces loss of micronutrients present in the lean particles when in contact with the lean particles;
   collecting the fat particles separate from the lean particles by causing the fat particles to rise in the fluid; and
   collecting the lean particles with saturated aqueous fluid, and then separating the lean particles from the aqueous saturated fluid.

2. The method of claim 1, further comprising allowing the water to comprise micronutrients that are found in beef at approximately the same concentration.

3. The method of claim 1, wherein the saturated fluid is saturated with a salt.

4. The method of claim 3, wherein the salt is sodium chloride.

5. The method of claim 1, wherein the fluid is fully saturated.

6. The method of claim 1, wherein the fluid is saturated with micronutrients.

7. The method of claim 1, further comprising treating the saturated fluid by irradiation with UVc energy before combining with the particles.

8. The method of claim 1, further comprising collecting the lean particles and fluid, separating the fluid, dehydrating the separated fluid, and combining dehydrated fluid with the lean particles.

9. The method of claim 1, further comprising emulsifying the fat particles to produce solids, converting the fat particles into oil, pasteurizing the oil and solids together by the application of heat, and separating the solids from the oil.

10. The method of claim 1, wherein the fluid is partially saturated.

11. The method of claim 1, wherein the fluid includes one or more micronutrients naturally found in serum of fresh beef.

12. The method of claim 11, wherein the one or more micronutrients are selected from vitamins, minerals, organic acids, organic and inorganic salts, and supplements.

13. The method of claim 1, further comprising adjusting the pH of the fluid to be acidic.

14. The method of claim 13, wherein the pH is about 2 to about 5.

* * * * *